(12) United States Patent
Srinivasan

(10) Patent No.: US 7,460,684 B2
(45) Date of Patent: Dec. 2, 2008

(54) METHOD AND APPARATUS FOR EMBEDDING WATERMARKS

(75) Inventor: Venugopal Srinivasan, Palm Harbor, FL (US)

(73) Assignee: Nielsen Media Research, Inc., New York, NY (US)

( * ) Notice: Subject to any disclaimer, the term of this patent is extended or adjusted under 35 U.S.C. 154(b) by 461 days.

(21) Appl. No.: 11/298,040

(22) Filed: Dec. 9, 2005

(65) Prior Publication Data

US 2007/0300066 A1 Dec. 27, 2007

Related U.S. Application Data

(63) Continuation of application No. PCT/US2004/018953, filed on Jun. 14, 2004.

(60) Provisional application No. 60/478,626, filed on Jun. 13, 2003, provisional application No. 60/571,258, filed on May 14, 2004.

(51) Int. Cl.
*G06K 9/00* (2006.01)
*H04L 9/00* (2006.01)

(52) U.S. Cl. ....................... 382/100; 713/176

(58) Field of Classification Search ............... 382/100, 382/232, 240, 233, 243, 244; 370/522–529; 713/176, 179; 380/51, 54, 201, 210, 252, 380/287; 283/72, 74–81, 93, 113, 901, 902; 700/94

See application file for complete search history.

(56) References Cited

U.S. PATENT DOCUMENTS

| | | | |
|---|---|---|---|
| 4,675,750 A * | 6/1987 | Collins et al. | ............... 386/112 |
| 5,319,453 A | 6/1994 | Copriviza | |
| 5,349,549 A | 9/1994 | Tsutsui | |
| 5,450,490 A | 9/1995 | Jensen et al. | |
| 5,455,630 A | 10/1995 | McFarland et al. | |
| 5,493,339 A | 2/1996 | Birch et al. | |
| 5,532,732 A | 7/1996 | Yuen et al. | |
| 5,539,471 A | 7/1996 | Myhrvold et al. | |
| 5,574,952 A | 11/1996 | Brady et al. | |
| 5,583,562 A | 12/1996 | Birch et al. | |
| 5,600,366 A | 2/1997 | Schulman | |
| 5,621,471 A | 4/1997 | Kim et al. | |
| 5,625,418 A | 4/1997 | Binder et al. | |
| 5,649,054 A | 7/1997 | Oomen et al. | |

(Continued)

FOREIGN PATENT DOCUMENTS

EP 0 651 554 3/1995

(Continued)

OTHER PUBLICATIONS

International Bureau, *International Search Report and Written Opinion*, Apr. 19, 2005, 10 pages.

(Continued)

*Primary Examiner*—Abolfazl Tabatabai
(74) *Attorney, Agent, or Firm*—Hanley, Flight & Zimmerman, LLC

(57) ABSTRACT

Methods and apparatus for embedding a watermark are disclosed. In an example method, one or more frames associated with a compressed digital data stream (240) is identified. Each of the one or more frames is unpacked to determine a plurality of transform coefficient sets (320). The plurality of transform coefficient sets (320) is modified to embed the watermark (230).

60 Claims, 11 Drawing Sheets

U.S. PATENT DOCUMENTS

| | | |
|---|---|---|
| 5,675,610 A | 10/1997 | Chinen |
| 5,677,980 A | 10/1997 | Naoe |
| 5,682,463 A | 10/1997 | Allen et al. |
| 5,687,191 A | 11/1997 | Lee et al. |
| 5,708,476 A | 1/1998 | Myhrvold et al. |
| 5,724,091 A | 3/1998 | Freeman et al. |
| 5,727,092 A | 3/1998 | Sandford, II et al. |
| 5,734,429 A | 3/1998 | Jung |
| 5,739,864 A | 4/1998 | Copeland |
| 5,739,866 A | 4/1998 | Kim et al. |
| 5,745,184 A | 4/1998 | Neal |
| 5,748,783 A | 5/1998 | Rhoads |
| 5,764,763 A | 6/1998 | Jensen et al. |
| 5,768,426 A | 6/1998 | Rhoads |
| 5,778,096 A | 7/1998 | Stearns |
| 5,778,102 A | 7/1998 | Sandford, II et al. |
| 5,801,782 A | 9/1998 | Patterson |
| 5,808,689 A | 9/1998 | Small |
| 5,848,155 A | 12/1998 | Cox |
| 5,852,800 A | 12/1998 | Modeste et al. |
| 5,867,819 A * | 2/1999 | Fukuchi et al. ............ 704/500 |
| 5,870,754 A | 2/1999 | Dimitrova et al. |
| 5,915,027 A | 6/1999 | Cox et al. |
| 5,917,830 A | 6/1999 | Chen et al. |
| 5,930,369 A | 7/1999 | Cox et al. |
| 6,029,045 A | 2/2000 | Picco et al. |
| 6,061,793 A | 5/2000 | Tewfik et al. |
| 6,064,748 A | 5/2000 | Hogan |
| 6,069,914 A | 5/2000 | Cox |
| 6,128,736 A | 10/2000 | Miller |
| 6,154,571 A | 11/2000 | Cox et al. |
| 6,181,334 B1 | 1/2001 | Freeman et al. |
| 6,208,691 B1 | 3/2001 | Balakrishnan et al. |
| 6,208,735 B1 * | 3/2001 | Cox et al. .................... 380/54 |
| 6,209,094 B1 | 3/2001 | Levine et al. |
| 6,215,526 B1 | 4/2001 | Barton et al. |
| 6,219,634 B1 | 4/2001 | Levine |
| 6,240,380 B1 | 5/2001 | Malvar |
| 6,243,481 B1 | 6/2001 | Tao |
| 6,252,586 B1 | 6/2001 | Freeman et al. |
| 6,259,801 B1 | 7/2001 | Wakasu |
| 6,266,419 B1 | 7/2001 | Lacy et al. |
| 6,268,866 B1 | 7/2001 | Shibata |
| 6,272,176 B1 | 8/2001 | Srinivasan |
| 6,278,792 B1 | 8/2001 | Cox et al. |
| 6,298,142 B1 | 10/2001 | Nakano et al. |
| 6,320,965 B1 | 11/2001 | Levine |
| 6,330,672 B1 | 12/2001 | Shur |
| 6,339,449 B1 | 1/2002 | Ikeda et al. |
| 6,343,181 B1 | 1/2002 | Ikeda et al. |
| 6,345,100 B1 | 2/2002 | Levine |
| 6,345,122 B1 | 2/2002 | Yamato et al. |
| 6,370,199 B1 | 4/2002 | Bock et al. |
| 6,373,960 B1 | 4/2002 | Conover et al. |
| 6,381,341 B1 | 4/2002 | Rhoads |
| 6,389,055 B1 | 5/2002 | August et al. |
| 6,415,041 B1 | 7/2002 | Oami et al. |
| 6,421,445 B1 | 7/2002 | Jensen et al. |
| 6,421,450 B2 | 7/2002 | Nakano |
| 6,424,726 B2 | 7/2002 | Nakano et al. |
| 6,425,082 B1 | 7/2002 | Matsui et al. |
| 6,434,253 B1 | 8/2002 | Hayashi et al. |
| 6,442,283 B1 * | 8/2002 | Tewfik et al. ............... 382/100 |
| 6,442,284 B1 | 8/2002 | Gustafson et al. |
| 6,442,285 B2 | 8/2002 | Rhoads et al. |
| 6,453,053 B1 | 9/2002 | Wakasu |
| 6,456,724 B1 | 9/2002 | Watanabe |
| 6,470,090 B2 | 10/2002 | Oami et al. |
| 6,493,457 B1 | 12/2002 | Quackenbush et al. |
| 6,504,870 B1 | 1/2003 | Srinivasan |
| 6,505,223 B1 * | 1/2003 | Haitsma et al. ............. 708/403 |
| 6,507,299 B1 | 1/2003 | Nuijten |
| 6,510,233 B1 | 1/2003 | Nakano |
| 6,512,796 B1 | 1/2003 | Sherwood |
| 6,553,070 B2 | 4/2003 | Hashimoto |
| 6,574,350 B1 * | 6/2003 | Rhoads et al. ............... 382/100 |
| 6,584,138 B1 | 6/2003 | Neubauer et al. |
| 6,587,821 B1 | 7/2003 | Rhoads |
| 6,611,607 B1 | 8/2003 | Davis et al. |
| 6,621,881 B2 | 9/2003 | Srinivasan |
| 6,631,198 B1 | 10/2003 | Hannigan et al. |
| 6,665,419 B1 | 12/2003 | Oami |
| 6,668,068 B2 | 12/2003 | Hashimoto |
| 6,683,966 B1 | 1/2004 | Tian et al. |
| 6,687,663 B1 | 2/2004 | McGrath et al. |
| 6,697,499 B2 | 2/2004 | Oami |
| 6,700,993 B1 | 3/2004 | Minematsu |
| 6,724,911 B1 | 4/2004 | Cox et al. |
| 6,735,325 B2 | 5/2004 | Wakasu |
| 6,738,493 B1 | 5/2004 | Cox et al. |
| 6,738,744 B2 | 5/2004 | Kirovski et al. |
| 6,751,337 B2 | 6/2004 | Tewfik et al. |
| 6,768,980 B1 | 7/2004 | Meyer et al. |
| 6,775,416 B1 | 8/2004 | Hashimoto |
| 6,785,399 B2 | 8/2004 | Fujihara |
| 6,798,893 B1 | 9/2004 | Tanaka |
| 6,807,528 B1 | 10/2004 | Truman et al. |
| 6,826,289 B1 | 11/2004 | Hashimoto |
| 6,834,345 B2 | 12/2004 | Bloom et al. |
| 6,845,360 B2 | 1/2005 | Jensen et al. |
| 6,850,619 B1 | 2/2005 | Hirai |
| 6,853,737 B2 | 2/2005 | Watanabe |
| 6,856,693 B2 | 2/2005 | Miller |
| 6,891,854 B2 | 5/2005 | Zhang et al. |
| 6,901,606 B2 | 5/2005 | Wright et al. |
| 6,915,000 B1 | 7/2005 | Tanaka |
| 6,928,165 B1 | 8/2005 | Takai |
| 6,943,457 B2 | 9/2005 | Smith |
| 6,947,562 B2 | 9/2005 | Hashimoto |
| 6,947,572 B2 | 9/2005 | Terasaki |
| 6,985,590 B2 | 1/2006 | Tachibana et al. |
| 6,996,249 B2 | 2/2006 | Miller et al. |
| 7,006,660 B2 | 2/2006 | Hayashi |
| 7,007,167 B2 | 2/2006 | Kurahashi |
| 7,027,611 B2 | 4/2006 | Hashimoto |
| 7,047,187 B2 | 5/2006 | Cheng et al. |
| 7,050,604 B2 | 5/2006 | Fujihara et al. |
| 7,051,207 B2 | 5/2006 | Watanabe |
| 7,051,351 B2 | 5/2006 | Goldman et al. |
| 7,088,844 B2 | 8/2006 | Hannigan et al. |
| 7,092,546 B2 | 8/2006 | Tanaka |
| 7,114,071 B1 | 9/2006 | Chmounk et al. |
| 7,114,073 B2 | 9/2006 | Watanabe |
| 7,140,037 B2 | 11/2006 | Tsutsui et al. |
| 7,146,501 B2 | 12/2006 | Tanaka |
| 7,149,324 B2 | 12/2006 | Tanaka |
| 7,159,117 B2 | 1/2007 | Tanaka |
| 7,181,022 B2 | 2/2007 | Rhoads |
| 7,197,156 B1 | 3/2007 | Levy |
| 7,206,649 B2 | 4/2007 | Kirovski et al. |
| 7,266,697 B2 | 9/2007 | Kirovski et al. |
| 7,269,734 B1 * | 9/2007 | Johnson et al. ............. 713/176 |
| 2001/0028715 A1 | 10/2001 | Watanabe |
| 2001/0031064 A1 | 10/2001 | Donescu et al. |
| 2001/0053190 A1 | 12/2001 | Srinivasan |
| 2002/0006203 A1 | 1/2002 | Tachibana et al. |
| 2002/0034224 A1 | 3/2002 | Srinivasan |
| 2002/0044225 A1 | 4/2002 | Rakib |
| 2002/0085736 A1 | 7/2002 | Kalker et al. |
| 2002/0085737 A1 | 7/2002 | Kitamura |
| 2002/0087864 A1 | 7/2002 | Depovere |
| 2002/0106106 A1 | 8/2002 | Sato |
| 2002/0129253 A1 | 9/2002 | Langelaar |
| 2002/0147990 A1 | 10/2002 | Lu et al. |

| | | |
|---|---|---|
| 2003/0004589 A1 | 1/2003 | Bruekers et al. |
| 2003/0016756 A1 | 1/2003 | Steenhof et al. |
| 2003/0086587 A1 | 5/2003 | Haitsma et al. |
| 2003/0088400 A1 | 5/2003 | Nishio et al. |
| 2003/0123660 A1 | 7/2003 | Fletcher et al. |
| 2003/0128861 A1 | 7/2003 | Rhoads |
| 2003/0161469 A1 | 8/2003 | Cheng et al. |
| 2003/0169810 A1 | 9/2003 | Costa |
| 2004/0054525 A1 | 3/2004 | Sekiguchi |
| 2004/0059918 A1 | 3/2004 | Xu |
| 2004/0179746 A1 | 9/2004 | Hashimoto |
| 2004/0267532 A1 | 12/2004 | Black |
| 2004/0267533 A1 | 12/2004 | Hannigan et al. |
| 2005/0010944 A1 | 1/2005 | Wright et al. |
| 2005/0062843 A1 | 3/2005 | Bowers et al. |
| 2006/0020809 A1 | 1/2006 | Hayashi |
| 2006/0123443 A1 | 6/2006 | Hamilton et al. |
| 2006/0171474 A1 | 8/2006 | Ramaswamy et al. |
| 2006/0187358 A1 | 8/2006 | Lienhart et al. |
| 2006/0239500 A1 | 10/2006 | Meyer et al. |
| 2007/0036357 A1 | 2/2007 | Veen et al. |

FOREIGN PATENT DOCUMENTS

| | | |
|---|---|---|
| WO | 99/63443 | 12/1999 |
| WO | 00/22605 | 4/2000 |
| WO | WO2000/064094 | 10/2000 |
| WO | 02/17214 | 2/2002 |
| WO | 02/49363 | 6/2002 |
| WO | 02/060182 | 8/2002 |
| WO | 03/009602 | 1/2003 |
| WO | WO2005/099385 | 10/2005 |
| WO | WO2006/014362 | 2/2006 |

OTHER PUBLICATIONS

International Bureau, *International Preliminary Report on Patentability*, Jan. 4, 2006, 22 pages.

C. Xu, J. Wu & D. Feng, "Content Based Digital Watermarking for Compressed Audio," (2000).

J. Stautner, "Scalable Audio Compression for Mixed Computing Environments," (1992).

J. Lacy, S. Quackenbush, A. Reibman, D. Shur & J. Snyder, "On Combining Watermarking with Perceptual Coding," (1998).

S. Cheng, H. Yu & Z. Xiong, "Enhanced Spread Spectrum Watermaking of MPEG-2 AAC Audio," (2002).

M. Watson & P. Buettner, "Design and Implementation of AAC Decoders," (2002).

Advanced Television Systems Committee, ATSC Standard: "Digital Audio Compression (AC-3), Revision A," Aug. 20, 2001, 140 Pages.

Leonardo Chiariglione, "International Organisation for Standardistion" Mar. 2001, 21 Pages.

John P. Princen et al., "Analysis/Synthesis Filter Bank Design Based on Time Domain Aliasing Cancellation" Oct. 5, 1986, 9 Pages.

B.G. Haskell et al., Digital Video: An Introduction to MPEG-2, 1996, pp. 55-79, 25 Pages.

Grant A. Davidson, "Digital Audio Coding: Dolby AC-3", pp. 41-1-41-21, 21 Pages.

Nidhal Abdulaziz et al., "Wavelet Transform and Channel Coding for Data Hiding in Video", Oct. 1998, 5 Pages.

W.N. Cheung, "Digital Image Watermarking in Spatial and Transform Domains", 2000, 5 Pages.

Linden deCarmo, "Pirates on the airwaves", Sep. 1999, 7 Pages.

Jianxun Liang et al., "Video Watermarking Combining with Hybrid Coding Scheme" 2002, 4 Pages.

Citeseer.ist.psu.edu, "Content-Based Digital Watermarking for Compressed Audio (2000)", 1995-2000, 1 Page.

Iis.fraunhofer.de/amm/techinf/water/, "Audio & Multimedia Watermarking", 1998-2006, 7 Pages.

IEEE, "Audio Watermarking in the Bitstream Domain", Jun. 12-13, 2000, 2 Pages.

* cited by examiner

| Mantissa Decimal | Bit Pattern | Mantissa Value |
|---|---|---|
| 0 | 0000 | -14/15 |
| 1 | 0001 | -12/15 |
| 2 | 0010 | -10/15 |
| 3 | 0011 | -8/15 |
| 4 | 0100 | -6/15 |
| 5 | 0101 | -4/15 |
| 6 | 0110 | -2/15 |
| 7 | 0111 | 0 |
| 8 | 1000 | +2/15 |
| 9 | 1001 | +4/15 |
| 10 | 1010 | +6/15 |
| 11 | 1011 | +8/15 |
| 12 | 1100 | +10/15 |
| 13 | 1101 | +12/15 |
| 14 | 1110 | +14/15 |

← 1300

| Frequency Index | "0" | "1" | "S" | "E" | 512-sample Central Frequency Index (k) | 12,288-sample Central Frequency Index | Approximate Central Frequency (Hz) |
|---|---|---|---|---|---|---|---|
| $f_1$ | 237 | 239 | 241 | 243 | 10 | 240 | 936 |
| $f_2$ | 289 | 291 | 285 | 287 | 12 | 288 | 1123 |
| $f_3$ | 339 | 337 | 335 | 333 | 14 | 336 | 1310 |
| $f_4$ | 383 | 381 | 387 | 385 | 16 | 384 | 1498 |
| $f_5$ | 429 | 431 | 433 | 435 | 18 | 432 | 1685 |
| $f_6$ | 481 | 483 | 477 | 479 | 20 | 480 | 1872 |
| $f_7$ | 531 | 529 | 527 | 525 | 22 | 528 | 2059 |
| $f_8$ | 575 | 573 | 577 | 579 | 24 | 576 | 2246 |
| $f_9$ | 621 | 623 | 625 | 627 | 26 | 624 | 2434 |
| $f_{10}$ | 673 | 675 | 669 | 671 | 28 | 672 | 2621 |

FIG. 13

METHOD AND APPARATUS FOR EMBEDDING WATERMARKS

RELATED APPLICATIONS

This application is a continuation of PCT application Ser. No. PCT/US2004/18953 filed Jun. 14, 2004, and claims the benefit of the filing date of U.S. Provisional Application No. 60/478,626, filed Jun. 13, 2003, and the benefit of U.S. Provisional Application No. 60/571,258, filed May 14, 2004, the disclosures of which are hereby incorporated herein by reference in their entireties.

TECHNICAL FIELD

The present disclosure relates generally to media measurements, and more particularly, to methods and apparatus for embedding watermarks in a compressed digital data stream.

BACKGROUND

In modern television or radio broadcast stations, compressed digital data streams are typically used to carry video and/or audio data for transmission. For example, the Advanced Television Systems Committee (ATSC) standard for digital television (DTV) broadcasts in the United States adopted Moving Picture Experts Group (MPEG) standards (e.g., MPEG-1, MPEG-2, MPEG-3, MPEG-4, etc.) for carrying video content and Digital Audio Compression standards (e.g., AC-3, which is also known as Dolby Digital®) for carrying audio content (i.e., ATSC Standard: Digital Audio Compression (AC-3), Revision A, August 2001). The AC-3 compression standard is based on a perceptual digital audio coding technique that reduces the amount of data needed to reproduce the original audio signal while minimizing perceptible distortion. In particular, the AC-3 compression standard recognizes that the human ear is unable to perceive changes in spectral energy at particular spectral frequencies that are smaller than the masking energy at those spectral frequencies. The masking energy is a characteristic of an audio segment dependent on the tonality and noise-like characteristic of the audio segment. Different known psycho-acoustic models may be used to determine the masking energy at a particular spectral frequency. Further, the AC-3 compression standard provides a multi-channel digital audio format (e.g., 5.1 channels format) for digital television (DTV), high definition television (HDTV), digital versatile discs (DVDs), digital cable, and satellite transmissions that enables the broadcast of special sound effects (e.g., surround sound).

Existing television or radio broadcast stations employ watermarking techniques to embed watermarks within video and/or audio data streams compressed in accordance with compression standards such as the AC-3 compression standard and the MPEG Advanced Audio Coding (AAC) compression standard. Typically, watermarks are digital data that uniquely identify broadcasters and/or programs. Watermarks are typically extracted using a decoding operation at one or more reception sites (e.g., households or other media consumption sites) and, thus, may be used to assess the viewing behaviors of individual households and/or groups of households to produce ratings information.

However, many existing watermarking techniques are designed for use with analog broadcast systems. In particular, existing watermarking techniques convert analog program data to an uncompressed digital data stream, insert watermark data in the uncompressed digital data stream, and convert the watermarked data stream to an analog format prior to transmission. In the ongoing transition towards an all-digital broadcast environment in which compressed video and audio streams are transmitted by broadcast networks to local affiliates, watermark data may need to be embedded or inserted directly in a compressed digital data stream. Existing watermarking techniques may decompress the compressed digital data stream into time-domain samples, insert the watermark data into the time-domain samples, and recompress the watermarked time-domain samples into a watermarked compressed digital data stream. Such decompression/compression may cause degradation in the quality of the media content in the compressed digital data stream. Further, existing decompression/compression techniques require additional equipment and cause delay of the audio component of a broadcast in a manner that, in some cases, may be unacceptable. Moreover, the methods employed by local broadcasting affiliates to receive compressed digital data streams from their parent networks and to insert local content through sophisticated splicing equipment prevent conversion of a compressed digital data stream to a time-domain (uncompressed) signal prior to recompression of the digital data streams.

BRIEF DESCRIPTION OF THE DRAWINGS

FIG. 13 depicts an example code frequency index table that may be used to implement the example watermark embedding system of FIG. 2.

DETAILED DESCRIPTION

In general, methods and apparatus for embedding watermarks in compressed digital data streams are disclosed herein. The methods and apparatus disclosed herein may be used to embed watermarks in compressed digital data streams without prior decompression of the compressed digital data streams. As a result, the methods and apparatus disclosed herein eliminate the need to subject compressed digital data streams to multiple decompression/compression cycles, which are typically unacceptable to, for example, affiliates of television broadcast networks because multiple decompression/compression cycles may significantly degrade the quality of media content in the compressed digital data streams.

Prior to broadcast, for example, the methods and apparatus disclosed herein may be used to unpack the modified discrete cosine transform (MDCT) coefficient sets associated with a compressed digital data stream formatted according to a digital audio compression standard such as the AC-3 compression standard. The mantissas of the unpacked MDCT coefficient sets may be modified to embed watermarks that imperceptibly augment the compressed digital data stream. Upon receipt of the compressed digital data stream, a receiving device (e.g., a set top television metering device at a media consumption site) may extract the embedded watermark information from an uncompressed analog output such as, for example, output emanating from speakers of a television set. The extracted watermark information may be used to identify the media sources and/or programs (e.g., broadcast stations) associated with media currently being consumed (e.g., viewed, listened to, etc.) at a media consumption site. In turn, the source and program identification information may be used in known manners to generate ratings information and/or any other information that may be used to assess the viewing behaviors associated with individual households and/or groups of households.

Figure 1:
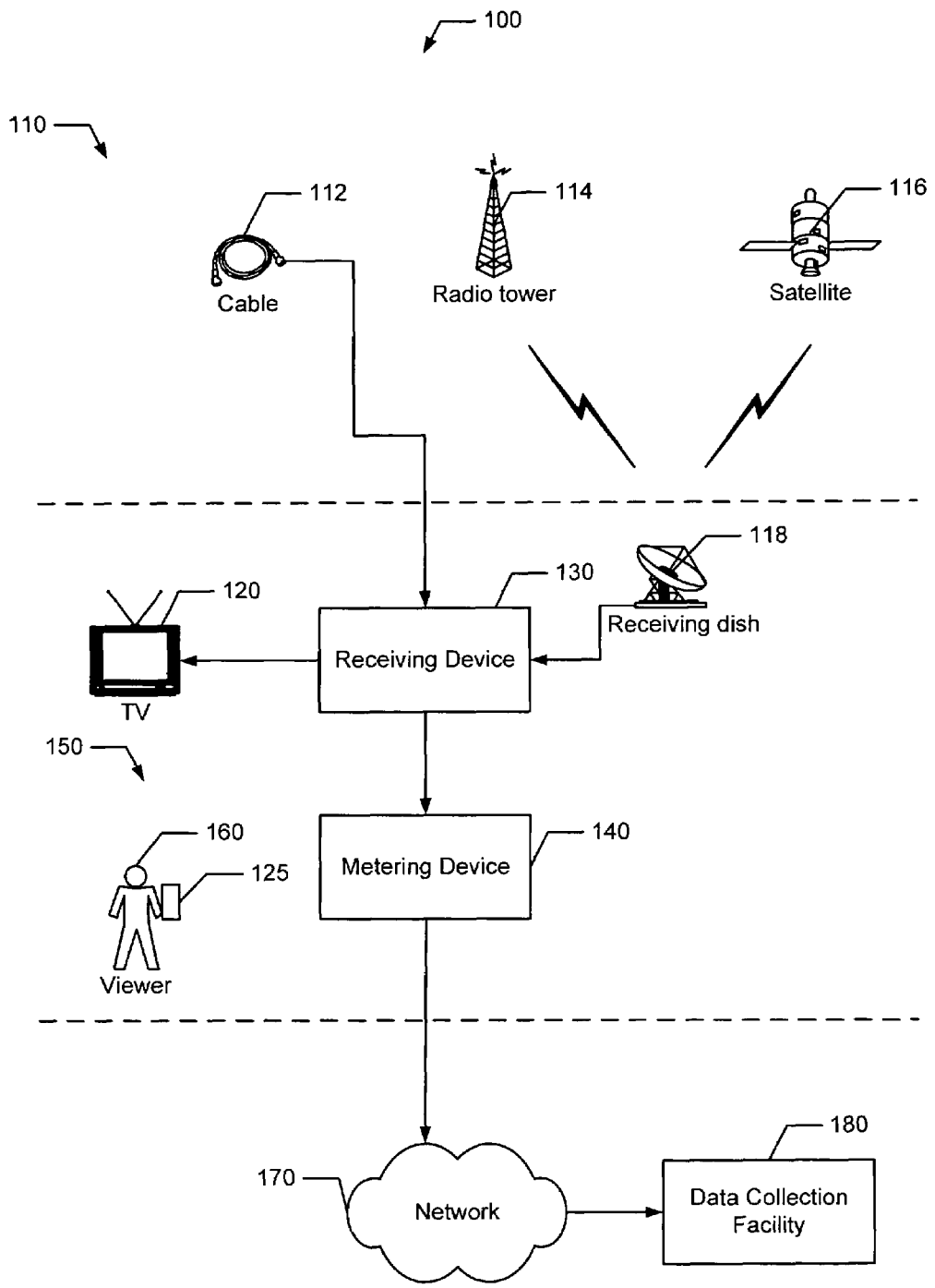
FIG. 1 is a block diagram representation of an example media monitoring system.

Referring to FIG. 1, an example broadcast system 100 including a service provider 110, a television 120, a remote control device 125, and a receiving device 130 is metered using an audience measurement system. The components of the broadcast system 100 may be coupled in any well-known manner. For example, the television 120 is positioned in a viewing area 150 located within a household occupied by one or more people, referred to as household members 160, some or all of whom have agreed to participate in an audience measurement research study. The receiving device 130 may be a set top box (STB), a video cassette recorder, a digital video recorder, a personal video recorder, a personal computer, a digital video disc player, etc. coupled to the television 120. The viewing area 150 includes the area in which the television 120 is located and from which the television 120 may be viewed by the one or more household members 160 located in the viewing area 150.

In the illustrated example, a metering device 140 is configured to identify viewing information based on video/audio output signals conveyed from the receiving device 130 to the television 120. The metering device 140 provides this viewing information as well as other tuning and/or demographic data via a network 170 to a data collection facility 180. The network 170 may be implemented using any desired combination of hardwired and wireless communication links, including for example, the Internet, an Ethernet connection, a digital subscriber line (DSL), a telephone line, a cellular telephone system, a coaxial cable, etc. The data collection facility 180 may be configured to process and/or store data received from the metering device 140 to produce ratings information.

The service provider 110 may be implemented by any service provider such as, for example, a cable television service provider 112, a radio frequency (RF) television service provider 114, and/or a satellite television service provider 116. The television 120 receives a plurality of television signals transmitted via a plurality of channels by the service provider 110 and may be adapted to process and display television signals provided in any format such as a National Television Standards Committee (NTSC) television signal format, a high definition television (HDTV) signal format, an Advanced Television Systems Committee (ATSC) television signal format, a phase alternation line (PAL) television signal format, a digital video broadcasting (DVB) television signal format, an Association of Radio Industries and Businesses (ARIB) television signal format, etc.

The user-operated remote control device 125 allows a user (e.g., the household member 160) to cause the television 120 to tune to and receive signals transmitted on a desired channel, and to cause the television 120 to process and present or deliver the programming or media content contained in the signals transmitted on the desired channel. The processing performed by the television 120 may include, for example, extracting a video and/or an audio component delivered via the received signal, causing the video component to be displayed on a screen/display associated with the television 120, and causing the audio component to be emitted by speakers associated with the television 120. The programming content contained in the television signal may include, for example, a television program, a movie, an advertisement, a video game, a web page, a still image, and/or a preview of other programming content that is currently offered or will be offered in the future by the service provider 110.

While the components shown in FIG. 1 are depicted as separate structures within the broadcast system 100, the functions performed by some of these structures may be integrated within a single unit or may be implemented using two or more separate components. For example, although the television 120 and the receiving device 130 are depicted as separate structures, the television 120 and the receiving device 130 may be integrated into a single unit (e.g., an integrated digital television set). In another example, the television 120, the receiving device 130, and/or the metering device 140 may be integrated into a single unit.

To assess the viewing behaviors of individual household members 160 and/or groups of households, a watermark embedding system (e.g., the watermark embedding system 200 of FIG. 2) may encode watermarks that uniquely identify broadcasters and/or programs in the broadcast signals from the service providers 110. The watermark embedding system may be implemented at the service provider 110 so that each of the plurality of media signals (e.g., television signals) transmitted by the service provider 110 includes one or more watermarks. Based on selections by the household members 160, the receiving device 130 may tune to and receive media signals transmitted on a desired channel and cause the television 120 to process and present the programming content contained in the signals transmitted on the desired channel. The metering device 140 may identify watermark information based on video/audio output signals conveyed from the receiving device 130 to the television 120. Accordingly, the metering device 140 may provide this watermark information as well as other tuning and/or demographic data to the data collection facility 180 via the network 170.

Figure 2:
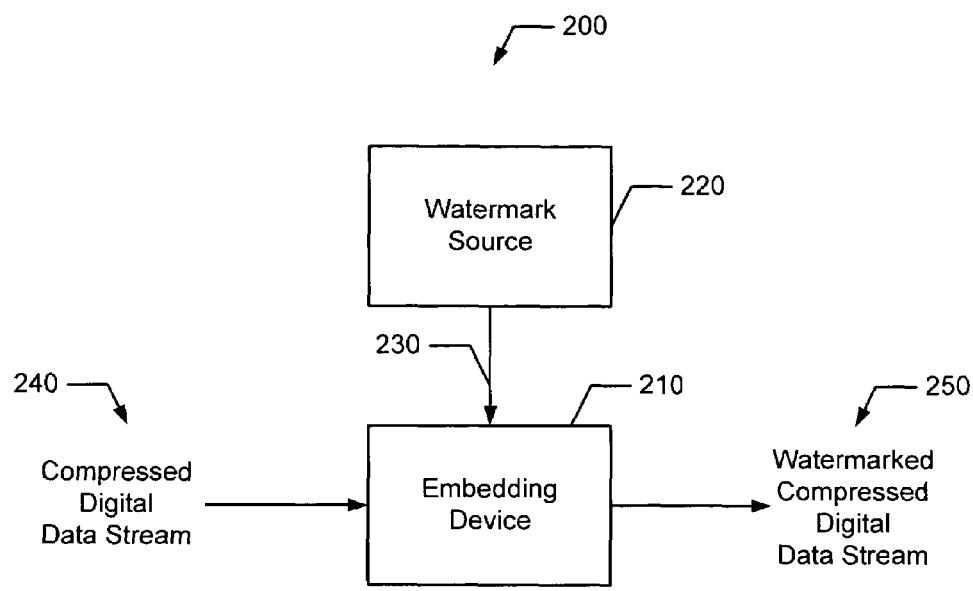
FIG. 2 is a block diagram representation of an example watermark embedding system.

In FIG. 2, an example watermark embedding system 200 includes an embedding device 210 and a watermark source 220. The embedding device 210 is configured to insert watermark information 230 from the watermark source 220 into a compressed digital data stream 240. The compressed digital data stream 240 may be compressed according to an audio compression standard such as the AC-3 compression standard and/or the MPEG-AAC compression standard, either of which may be used to process blocks of an audio signal using a predetermined number of digitized samples from each block. The source of the compressed digital data stream 240 (not shown) may be sampled at a rate of, for example, 48 kilohertz (kHz) to form audio blocks as described below.

Typically, audio compression techniques such as those based on the AC-3 compression standard use overlapped audio blocks and the MDCT algorithm to convert an audio signal into a compressed digital data stream (e.g., the compressed digital data stream 240 of FIG. 2). Two different block sizes (i.e., short and long blocks) may be used depending on the dynamic characteristics of the sampled audio signal. For example, AC-3 short blocks may be used to minimize pre-echo for transient segments of the audio signal and AC-3 long blocks may be used to achieve high compression gain for non-transient segments of the audio signal. In accordance with the AC-3 compression standard an AC-3 long block corresponds to a block of 512 time-domain audio samples, whereas an AC-3 short block corresponds to 256 time-domain audio samples. Based on the overlapping structure of the MDCT algorithm used in the AC-3 compression standard, in the case of the AC-3 long block, the 512 time-domain samples are obtained by concatenating a preceding (old) block of 256 time-domain samples and a current (new) block of 256 time-domain samples to create an audio block of 512 time-domain samples. The AC-3 long block is then transformed using the MDCT algorithm to generate 256 transform coefficients. In accordance with the same standard, an AC-3 short block is similarly obtained from a pair of consecutive time-domain sample blocks of audio. The AC-3 short block is then transformed using the MDCT algorithm to generate 128 transform coefficients. The 128 transform coefficients corresponding to two adjacent short blocks are then interleaved to generate a set of 256 transform coefficients. Thus, processing of either AC-3 long or AC-3 short blocks results in the same number of MDCT coefficients. In accordance with the MPEG-AAC compression standard as another example, a short block contains 128 samples and a long block contains 1024 samples.

Figure 3:
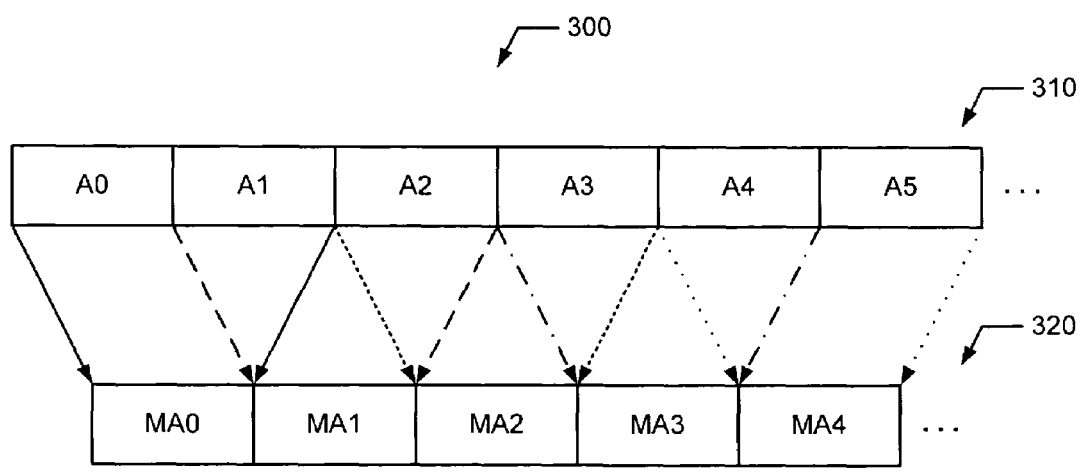
FIG. 3 is a block diagram representation of an example uncompressed digital data stream associated with the example watermark embedding system of FIG. 2.

In the example of FIG. 3, an uncompressed digital data stream 300 includes a plurality of 256-sample time-domain audio blocks 310, generally shown as A0, A1, A2, A3, A4, and A5. The MDCT algorithm processes the audio blocks 310 to generate MDCT coefficient sets 320, shown by way of example as MA0, MA1, MA2, MA3, MA4, and MA5 (where MA5 is not shown). For example, the MDCT algorithm may process the audio blocks A0 and A1 to generate the MDCT coefficient set MA0. The audio blocks A0 and A1 are concatenated to generate a 512-sample audio block (e.g., an AC-3 long block) that is MDCT transformed using the MDCT algorithm to generate the MDCT coefficient set MA0 which includes 256 MDCT coefficients. Similarly, the audio blocks A1 and A2 may be processed to generate the MDCT coefficient set MA1. Thus, the audio block A1 is an overlapping audio block because it is used to generate both MDCT coefficient sets MA0 and MA1. In a similar manner, the MDCT algorithm is used to transform the audio blocks A2 and A3 to generate the MDCT coefficient set MA2, the audio blocks A3 and A4 to generate the MDCT coefficient set MA3, the audio blocks A4 and A5 to generate the MDCT coefficient set MA4, etc. Thus, the audio block A2 is an overlapping audio block used to generate the MDCT coefficient sets MA1 and MA2, the audio block A3 is an overlapping audio block used to generate the MDCT coefficient sets MA2 and MA3, the audio block A4 is an overlapping audio block used to generate the MDCT coefficient sets MA3 and MA4, etc. Together, the MDCT coefficient sets 320 form the compressed digital data stream 240.

As described in detail below, the embedding device 210 of FIG. 2 may embed or insert the watermark information or watermark 230 from the watermark source 220 into the compressed digital data stream 240. The watermark 230 may be used, for example, to uniquely identify broadcasters and/or programs so that media consumption information (e.g., viewing information) and/or ratings information may be produced. Accordingly, the embedding device 210 produces a watermarked compressed digital data stream 250 for transmission.

Figures 4, 6:
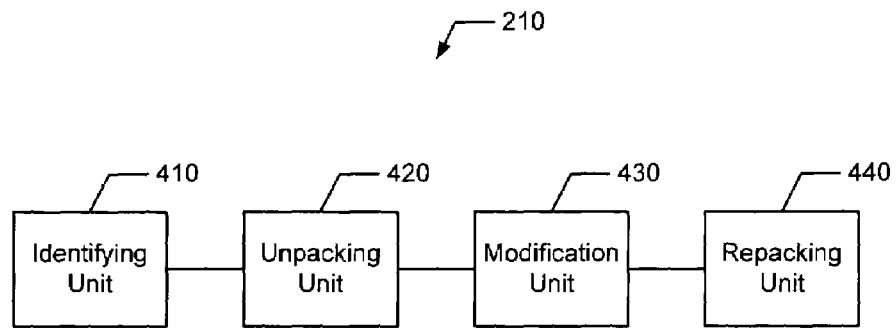
FIG. 4 is a block diagram representation of an example embedding device that may be used to implement the example watermark embedding system of FIG. 2.
FIG. 6 depicts an example quantization look-up table that may be used to implement the example watermark embedding system of FIG. 2.

In the example of FIG. 4, the embedding device 210 includes an identifying unit 410, an unpacking unit 420, a modification unit 430, and a repacking unit 440. While the operation of the embedding device 210 is described below in accordance with the AC-3 compression standard, the embedding device 210 may be implemented to operate with additional or other compression standards such as, for example, the MPEG-AAC compression standard. The operation of the embedding device 210 is described in greater detail in connection with FIG. 5.

Figure 5:
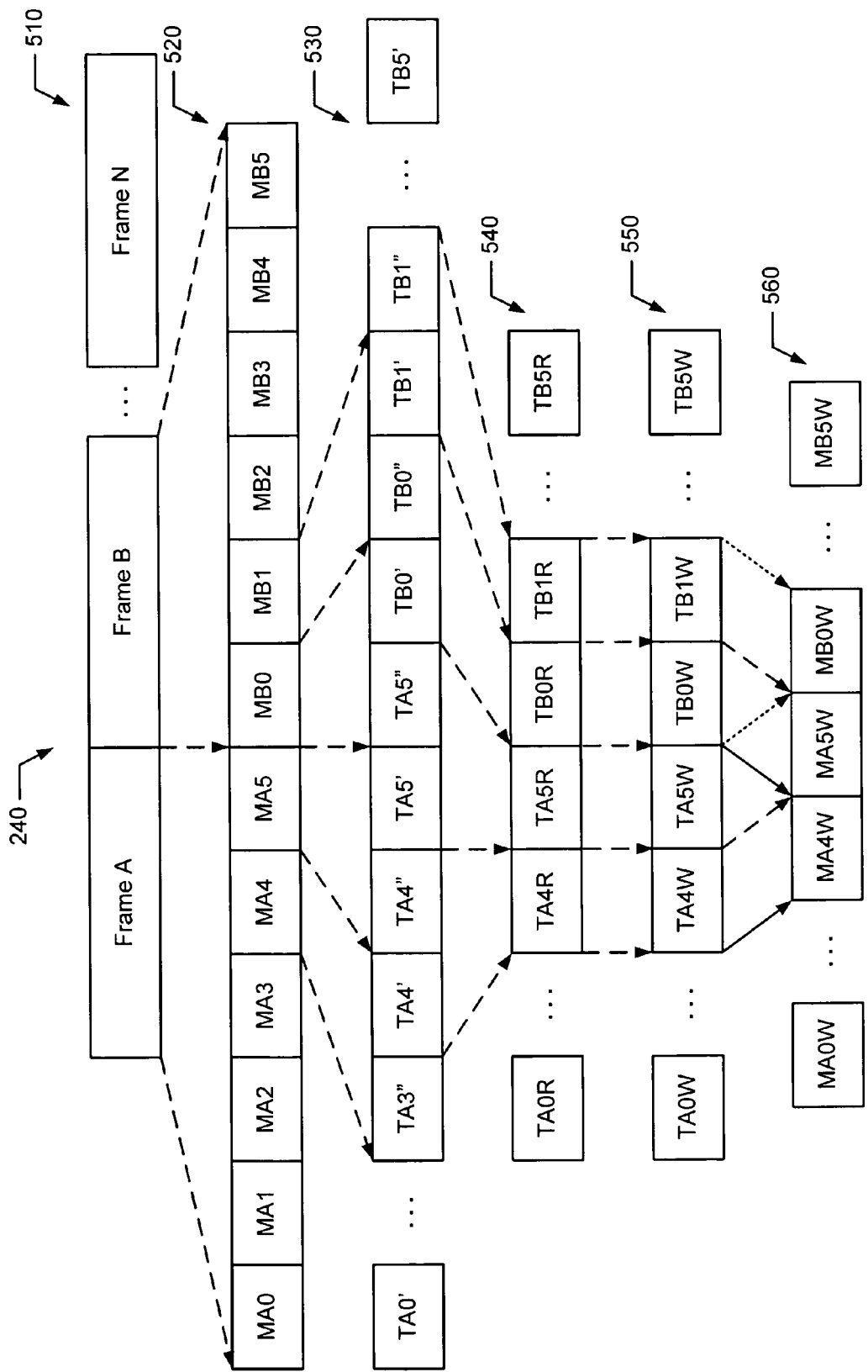
FIG. 5 depicts an example compressed digital data stream associated with the example embedding device of FIG. 4.

To begin, the identifying unit 410 is configured to identify one or more frames 510 associated with the compressed digital data stream 240, a portion of which is shown by way of example as Frame A and Frame B in FIG. 5. As mentioned previously, the compressed digital data stream 240 may be a digital data stream compressed in accordance with the AC-3 standard (hereinafter "AC-3 data stream"). While the AC-3 data stream 240 may include multiple channels, for purposes of clarity, the following example describes the AC-3 data stream 240 as including only one channel. In the AC-3 data stream 240, each of the frames 510 includes a plurality of MDCT coefficient sets 520. In accordance with the AC-3 compression standard, for example, each of the frames 510 includes six MDCT coefficient sets (i.e., six "audblk"). For example, Frame A includes the MDCT coefficient sets MA0, MA1, MA2, MA3, MA4 and MA5 and Frame B includes the MDCT coefficient sets MB0, MB1, MB2, MB3, MB4 and MB5.

The identifying unit 410 is also configured to identify header information associated with each of the frames 510, such as, for example, the number of channels associated with the AC-3 data stream 240. While the example AC-3 data stream 240 includes only one channel as noted above, an example compressed digital data stream having multiple channels is described below in connection with FIGS. 7 and 8.

Returning to FIG. 5, the unpacking unit 420 is configured to unpack the MDCT coefficient sets 520 to determine compression information such as, for example, the parameters of the original compression process (i.e., the manner in which an audio compression technique compressed an audio signal or audio data to form the compressed digital data stream 240). For example, the unpacking unit 420 may determine how many bits are used to represent each of the MDCT coefficients within the MDCT coefficient sets 520. Additionally, compression parameters may include information that limits the extent to which the AC-3 data stream 240 may be modified to ensure that the media content conveyed via the AC-3 data stream 240 is of a sufficiently high quality level. The embedding device 210 subsequently uses the compression information identified by the unpacking unit 420 to embed/insert the desired watermark information 230 into the AC-3 data stream 240 thereby ensuring that the watermark insertion is performed in a manner consistent with the compression information supplied in the signal.

As described in detail in the AC-3 compression standard, the compression information also includes a mantissa and an exponent associated with each MDCT coefficient. The AC-3 compression standard employs techniques to reduce the number of bits used to represent each MDCT coefficient. Psychoacoustic masking is one factor that may be utilized by these techniques. For example, the presence of audio energy $E_k$ either at a particular frequency k (e.g., a tone) or spread across a band of frequencies proximate to the particular frequency k (e.g., a noise-like characteristic) creates a masking effect. That is, the human ear is unable to perceive a change in energy in a spectral region either at a frequency k or spread across the band of frequencies proximate to the frequency k if that change is less than a given energy threshold $\Delta E_k$. Because of this characteristic of the human ear, an MDCT coefficient $m_k$ associated with the frequency k may be quantized with a step size related to $\Delta E_k$ without risk of causing any humanly perceptible changes to the audio content. For the AC-3 data stream 240, each MDCT coefficient $m_k$ is represented as a mantissa $M_k$ and an exponent $X_k$ such that $m_k = M_k \cdot 2^{-X_k}$. The number of bits used to represent the mantissa $M_k$ of each MDCT coefficient of the MDCT coefficient sets 520 may be determined based on known quantization look-up tables published in the AC-3 compression standard (e.g., the quantization look-up table 600 of FIG. 6). In the example of FIG. 6, the quantization look-up table 600 provides mantissa codes or bit patterns and corresponding mantissa values for MDCT coefficients represented by a four-bit number. As described in detail below, the mantissa $M_k$ may be changed (e.g., augmented) to represent a modified value of an MDCT coefficient to embed a watermark in the AC-3 data stream 240.

Returning to FIG. 5, the modification unit 430 is configured to perform an inverse transform of each of the MDCT coefficient sets 520 to generate time-domain audio blocks 530, shown by way of example as TA0', TA3'', TA4', TA4'', TA5', TA5'', TB0', TB0'', TB1', TB1'', and TB5' (TA0'' through TA3' and TB2' through TB4'' are not shown). The modification unit 430 performs inverse transform operations to generate sets of previous (old) time-domain audio blocks (which are represented as prime blocks) and sets of current (new) time-domain audio blocks (which are represented as double-prime blocks) associated with the 256-sample time-domain audio blocks that were concatenated to form the MDCT coefficient sets 520 of the AC-3 data stream 240. For example, the modification unit 430 performs an inverse transform on the MDCT coefficient set MA5 to generate time-domain blocks TA4'' and TA5', the MDCT coefficient set MB0 to generate TA5'' and TB0', the MDCT coefficient set MB1 to generate TB0'' and TB1', etc. In this manner, the modification unit 430 generates reconstructed time-domain audio blocks 540, which provide a reconstruction of the original time-domain audio blocks that were compressed to form the AC-3 data stream 240. To generate the reconstructed time-domain audio blocks 540, the modification unit 430 may add time-domain audio blocks based on, for example, the known Princen-Bradley time domain alias cancellation (TDAC) technique as described in Princen et al., *Analysis/Synthesis Filter Bank Design Based on Time Domain Aliasing Cancellation,* Institute of Electrical and Electronics Engineers (IEEE) Transactions on Acoustics, Speech and Signal Processing, Vol. ASSP-35, No. 5, pp. 1153-1161 (1996). For example, the modification unit 430 may reconstruct the time-domain audio block TA5 (i.e., TA5R) by adding the prime time-domain audio block TA5' and the double-prime time-domain audio block TA5'' using the Princen-Bradley TDAC technique. Likewise, the modification unit 430 may reconstruct the time-domain audio block TB0 (i.e., TB0R) by adding the prime audio block TB0' and the double-prime audio block TB0'' using the Princen-Bradley TDAC technique. In this manner, the original time-domain audio blocks used to form the AC-3 data stream 240 are reconstructed to enable the watermark 230 to be embedded or inserted directly into the AC-3 data stream 240.

The modification unit 430 is also configured to insert the watermark 230 into the reconstructed time-domain audio blocks 540 to generate watermarked time-domain audio blocks 550, shown by way of example as TA0W, TA4W, TA5W, TB0W, TB1W and TB5W (blocks TA1W, TA2W, TA3W, TB2W, TB3W and TB4W are not shown). To insert the watermark 230, the modification unit 430 generates a modifiable time-domain audio block by concatenating two adjacent reconstructed time-domain audio blocks to create a 512-sample audio block. For example, the modification unit 430 may concatenate the reconstructed time-domain audio blocks TA5R and TB0R (each being a 256-sample audio block) to form a 512-sample audio block. The modification unit 430 may then insert the watermark 230 into the 512-sample audio block formed by the reconstructed time-domain audio blocks TA5R and TB0R to generate the watermarked time-domain audio blocks TA5W and TB0W. Encoding processes such as those described in U.S. Pat. Nos. 6,272,176, 6,504,870, and 6,621,881 may be used to insert the watermark 230 into the reconstructed time-domain audio blocks 540. The disclosures of U.S. Pat. Nos. 6,272,176, 6,504,870, and 6,621,881 are hereby incorporated by reference herein in their entireties.

In the example encoding methods and apparatus described in U.S. Pat. Nos. 6,272,176, 6,504,870, and 6,621,881, watermarks may be inserted into a 512-sample audio block. For example, each 512-sample audio block carries one bit of embedded or inserted data of the watermark 230. In particular, spectral frequency components with indices $f_1$ and $f_2$ may be modified or augmented to insert data bits associated with the watermark 230. To insert a binary "1," for example, a power at the first spectral frequency associated with the index $f_1$ may be increased or augmented to be a spectral power maximum within a frequency neighborhood (e.g., a frequency neighborhood defined by the indices $f_1-2$, $f_1-1$, $f_1$, $f_1+1$, and $f_1+2$). At the same time, the power at the second spectral frequency associated with the index $f_2$ is attenuated or augmented to be a spectral power minimum within a frequency neighborhood (e.g., a frequency neighborhood defined by the indices $f_2-2$, $f_2-1$, $f_2$, $f_2+1$, and $f_2+2$). Conversely, to insert a binary "0," the power at the first spectral frequency associated with the index $f_1$ is attenuated to be a local spectral power minimum while the power at the second spectral frequency associated with the index $f_2$ is increased to a local spectral power maximum.

Returning to FIG. 5, based on the watermarked time-domain audio blocks 550, the modification unit 430 generates watermarked MDCT coefficient sets 560, shown by way of example as MA0W, MA4W, MA5W, MB0W and MB5W (blocks MA1W, MA2W, MA3W, MB1W, MB2W, MB3W and MB4W are not shown). Following the example described above, the modification unit 430 generates the watermarked MDCT coefficient set MA5W based on the watermarked time-domain audio blocks TA5W and TB0W. Specifically, the modification unit 430 concatenates the watermarked time-domain audio blocks TA5W and TB0W to form a 512-sample audio block and converts the 512-sample audio block into the watermarked MDCT coefficient set MA5W which, as described in greater detail below, may be used to modify the original MDCT coefficient set MA5.

The difference between the MDCT coefficient sets 520 and the watermarked MDCT coefficient sets 560 represents a change in the AC-3 data stream 240 as a result of embedding or inserting the watermark 230. As described in connection with FIG. 6, for example, the modification unit 430 may modify the mantissa values in the MDCT coefficient set MA5 based on the differences between the coefficients in the corresponding watermarked MDCT coefficient set MA5W and the coefficients in the original MDCT coefficient set MA5. Quantization look-up tables (e.g., the look-up table 600 of FIG. 6) may be used to determine new mantissa values associated with the MDCT coefficients of the watermarked MDCT coefficient sets 560 to replace the old mantissa values associated with the MDCT coefficients of the MDCT coefficient sets 520. Thus, the new mantissa values represent the change in or augmentation of the AC-3 data stream 240 as a result of embedding or inserting the watermark 230. It is important to note that, in this example implementation, the exponents of the MDCT coefficients are not changed. Changing the exponents might require that the underlying compressed signal representation be recomputed, thereby requiring the compressed signal to undergo a true decompression/compression cycle. If a modification of only the mantissa is insufficient to fully account for the difference between a watermarked and an original MDCT coefficient, the affected MDCT mantissa is set to a maximum or minimum value, as appropriate. The redundancy included in the watermarking process allows the correct watermark to be decoded in the presence of such an encoding restriction.

Turning to FIG. 6, the example quantization look-up table 600 includes mantissa codes and mantissa values for a fifteen-level quantization of an example mantissa $M_k$ in the range of −0.9333 to +0.9333. While the example quantization look-up table 600 provides mantissa information associated with MDCT coefficients that are represented using four bits, the AC-3 compression standard provides quantization look-up tables associated with other suitable numbers of bits per MDCT coefficient. To illustrate one manner in which the modification unit 430 may modify a particular MDCT coefficient $m_k$ with a mantissa $M_k$ contained in the MDCT coefficient set MA5, assume the original mantissa value is −0.2666 (i.e., −4/15). Using the quantization look-up table 600, the mantissa code corresponding to the particular MDCT coefficient $m_k$ in the MDCT coefficient set MA5 is determined to be 0101. The watermarked MDCT coefficient set MA5W includes a watermarked MDCT coefficient $wm_k$ with a mantissa value $WM_k$. Further, assume the new mantissa value of the corresponding watermarked MDCT coefficient $wm_k$ of the watermarked MDCT coefficient set MA5W is −0.4300, which lies between the mantissa codes of 0011 and 0100. In other words, the watermark 230, in this example, results in a difference of −0.1667 between the original mantissa value of −0.2666 and the watermarked mantissa value of −0.4300.

To embed or insert the watermark 230 in the AC-3 data stream 240, the modification unit 430 may use the watermarked MDCT coefficient set MA5W to modify or augment the MDCT coefficients in the MDCT coefficient set MA5. Continuing with above example, either mantissa code 0011 or mantissa code 0100 may replace the mantissa code 0101 associated with the MDCT coefficient $m_k$ because the watermarked mantissa $WM_k$ associated with the corresponding watermarked MDCT coefficient $wm_k$ lies between the mantissa codes of 0011 and 0100 (because the mantissa value corresponding to the watermarked MDCT coefficient $wm_k$ is −0.4300). The mantissa value corresponding to the mantissa code 0011 is −0.5333 (i.e., −8/15) and the mantissa value corresponding to the mantissa code 0100 is −0.4 (i.e., −6/15). In this example, the modification unit 430 selects the mantissa code 0100 instead of the mantissa code 0011 to replace the original mantissa code 0101 associated with the MDCT coefficient $m_k$ because the mantissa value −0.4 corresponding to the mantissa code 0100 is closest to the desired watermark mantissa value −0.4300. As a result, the new mantissa bit pattern of 0100, which corresponds to the watermarked mantissa $WM_k$ of the watermarked MDCT coefficient $wm_k$, replaces the original mantissa bit pattern of 0101. Likewise, each of the MDCT coefficients in the MDCT coefficient set MA5 may be modified in the manner described above. If a watermarked mantissa value is outside the quantization range of mantissa values (i.e., greater than 0.9333 or less than −0.9333), either the positive limit of 1110 or the negative limit of 0000 is selected as the new mantissa code, as appropriate. Additionally, and as discussed above, while the mantissa codes associated with each MDCT coefficient of an MDCT coefficient set may be modified as described above, the exponents associated with the MDCT coefficients remain unchanged.

The repacking unit 440 is configured to repack the watermarked MDCT coefficient sets 560 associated with each frame of the AC-3 data stream 240 for transmission. In particular, the repacking unit 440 identifies the position of each MDCT coefficient set within a frame of the AC-3 data stream 240 so that the corresponding watermarked MDCT coefficient set can be used to modify the MDCT coefficient set. To rebuild a watermarked version of Frame A, for example, the repacking unit 440 may identify the position of and modify the MDCT coefficient sets MA0 to MA5 based on the corresponding watermarked MDCT coefficient sets MA0W to MA5W in the corresponding identified positions. Using the unpacking, modifying, and repacking processes described herein, the AC-3 data stream 240 remains a compressed digital data stream while the watermark 230 is embedded or inserted in the AC-3 data stream 240. As a result, the embedding device 210 inserts the watermark 230 into the AC-3 data stream 240 without additional decompression/compression cycles that may degrade the quality of the media content in the AC-3 data stream 240.

Figure 7:
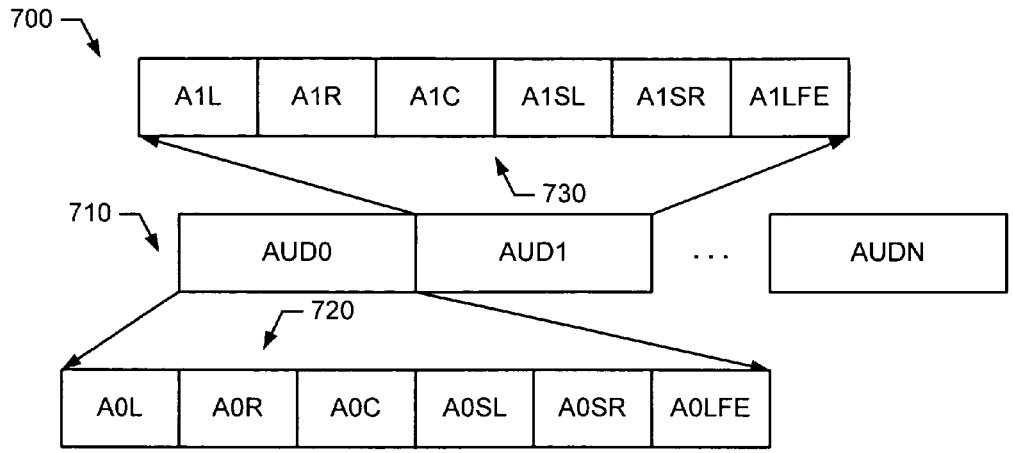
FIG. 7 depicts another example uncompressed digital data stream that may be compressed and then processed using the example watermark embedding system of FIG. 2.

For simplicity, the AC-3 data stream 240 is described in connection with FIG. 5 to include a single channel. However, the methods and apparatus disclosed herein may be applied to compressed digital data streams having audio blocks associated with multiple channels, such as 5.1 channels (i.e., five full-bandwidth channels), as described below. In the example of FIG. 7, an uncompressed digital data stream 700 may include a plurality of audio block sets 710. Each of the audio block sets 710 may include audio blocks associated with multiple channels 720 and 730 including, for example, a front left channel, a front right channel, a center channel, a surround left channel, a surround right channel, and a low-frequency effect (LFE) channel (e.g., a sub-woofer channel). For example, the audio block set AUD0 includes an audio block A0L associated with the front left channel, an audio block A0R associated with the front right channel, an audio block A0C associated with the center channel, an audio block A0SL associated with the surround left channel, an audio block A0SR associated with the surround right channel, and an audio block A0LFE associated with the LFE channel. Similarly, the audio block set AUD1 includes an audio block A1L associated with the front left channel, an audio block A1R associated with the front right channel, an audio block A1C associated with the center channel, an audio block A1SL associated with the surround left channel, an audio block A1SR associated with the surround right channel, and an audio block A1LFE associated with the LFE channel.

Figure 8:
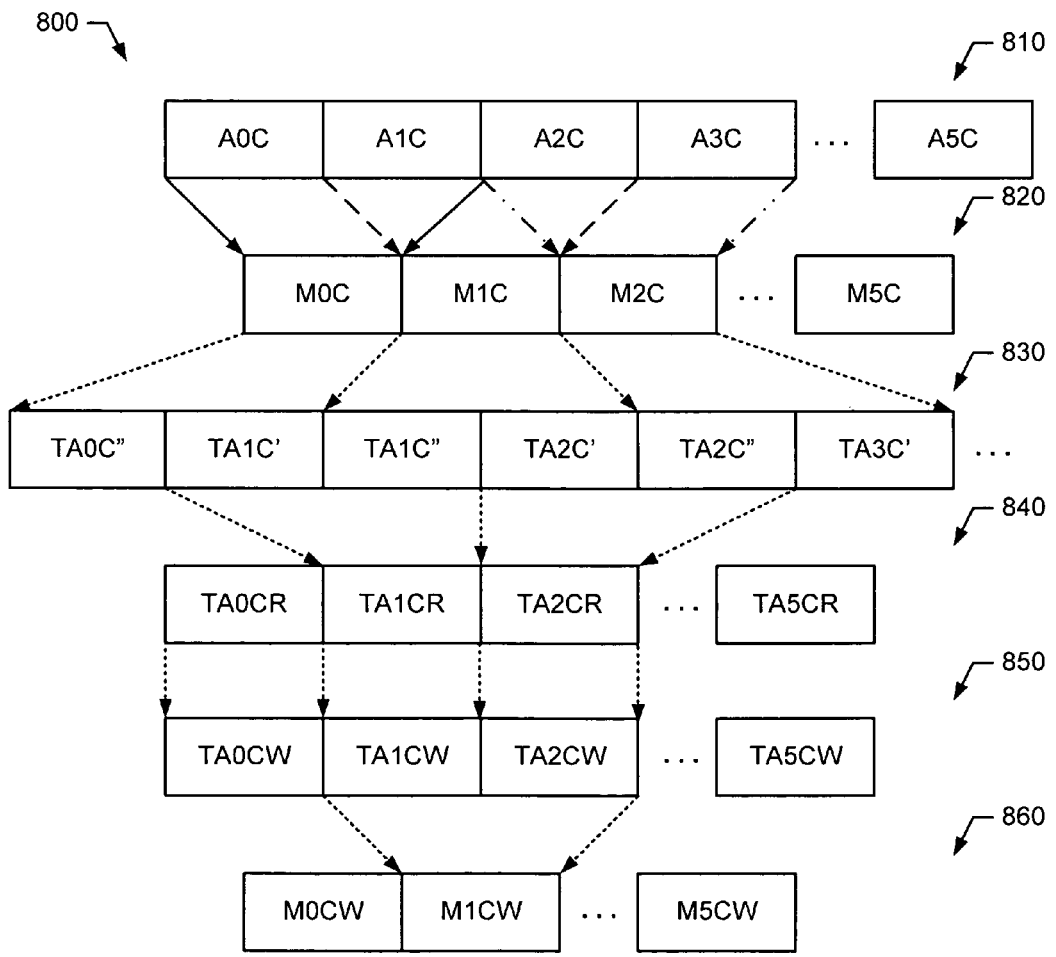
FIG. 8 depicts an example compressed digital data stream associated with the example uncompressed digital data stream of FIG. 7.

Each of the audio blocks associated with a particular channel in the audio block sets 710 may be processed in a manner similar to that described above in connection with FIGS. 5 and 6. For example, the audio blocks associated with the center channel 810 of FIG. 8, shown by way of example as A0C, A1C, A2C, and A3C, may be transformed to generate the MDCT coefficient sets 820 associated with a compressed digital data stream 800. As noted above, each of the MDCT coefficient sets 820 may be derived from a 512-sample audio block formed by concatenating a preceding (old) 256-sample audio block and a current (new) 256-sample audio block. The MDCT algorithm may then process the time-domain audio blocks 810 (e.g., A0C through A5C) to generate the MDCT coefficient sets (e.g., M0C through M5C).

Based on the MDCT coefficient sets 820 of the compressed digital data stream 800, the identifying unit 410 identifies a plurality of frames (not shown) and header information associated with each of the frames as described above. The header information includes compression information associated with the compressed digital data stream 800. For each of the frames, the unpacking unit 420 unpacks the MDCT coefficient sets 820 to determine the compression information associated with the MDCT coefficient sets 820. For example, the unpacking unit 420 may identify the number of bits used by the original compression process to represent the mantissa of each MDCT coefficient in each of the MDCT coefficient sets 820. Such compression information may be used to embed the watermark 230 as described above in connection with FIG. 6. The modification unit 430 then generates inverse transformed time-domain audio blocks 830, shown by way of example as TA0C", TA1C', TA1C", TA2C', TA2C", and TA3C'. The time-domain audio blocks 830 include a set of previous (old) time-domain audio blocks (which are represented as prime blocks) and a set of current (new) time-domain audio blocks (which are represented as double-prime blocks). By adding the corresponding prime blocks and double-prime blocks based on, for example, the Princen-Bradley TDAC technique, original time-domain audio blocks compressed to form the AC-3 digital data stream 800 may be reconstructed (i.e., the reconstructed time-domain audio blocks 840). For example, the modification unit 430 may add the time-domain audio blocks TA1C' and TA1C" to reconstruct the time-domain audio block TA1C (i.e., TA1CR). Likewise, the modification unit 430 may add the time-domain audio blocks TA2C' and TA2C" to reconstruct the time-domain audio block TA2C (i.e., TA2CR).

To insert the watermark 230 from the watermark source 220, the modification unit 430 concatenates two adjacent reconstructed time-domain audio blocks to create a 512-sample audio block (i.e., a modifiable time-domain audio block). For example, the modification unit 430 may concatenate the reconstructed time-domain audio blocks TA1CR and TA2CR, each of which is a 256-sample short block, to form a 512-sample audio block. The modification unit 430 then inserts the watermark 230 into the 512-sample audio block formed by the reconstructed time-domain audio blocks TA1CR and TA2CR to generate the watermarked time-domain audio blocks TA1CW and TA2CW.

Based on the watermarked time-domain audio blocks 850, the modification unit 430 may generate the watermarked MDCT coefficient sets 860. For example, the modification unit 430 may concatenate the watermarked time-domain audio blocks TA1CW and TA2CW to generate the watermarked MDCT coefficient set M1CW. The modification unit 430 modifies the MDCT coefficient sets 820 based on a corresponding one of the watermarked MDCT coefficient sets 860. For example, the modification unit 430 may use the watermarked MDCT coefficient set M1CW to modify the original MDCT coefficient set M1C. The modification unit 430 may then repeat the process described above for the audio blocks associated with each channel to insert the watermark 230 into the compressed digital data stream 800.

Figure 9:
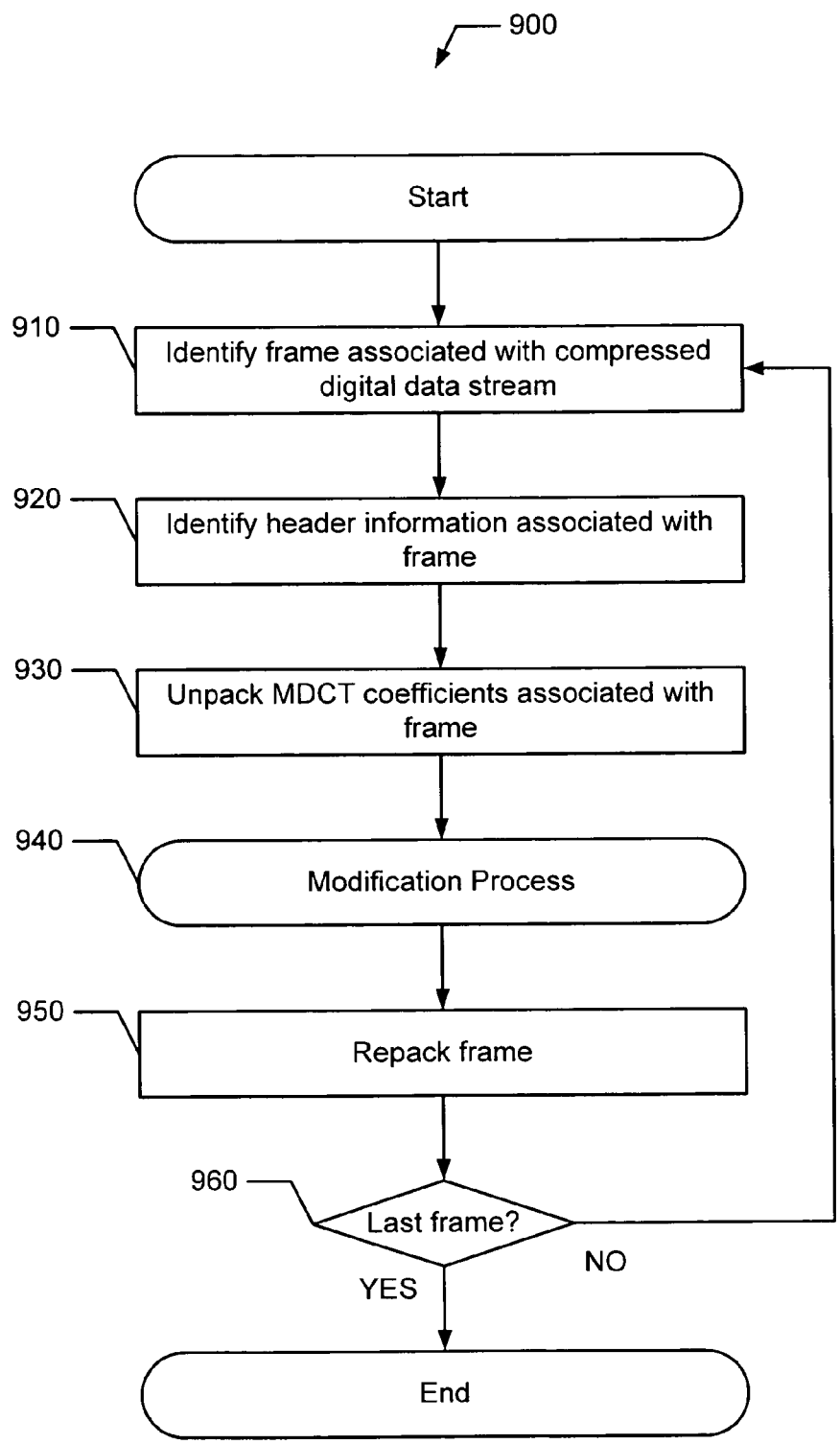
FIG. 9 depicts one manner in which the example watermark embedding system of FIG. 2 may be configured to embed watermarks.

FIG. 9 is a flow diagram depicting one manner in which the example watermark embedding system of FIG. 2 may be configured to embed or insert watermarks in a compressed digital data stream. The example process of FIG. 9 may be implemented as machine accessible instructions utilizing any of many different programming codes stored on any combination of machine-accessible media such as a volatile or nonvolatile memory or other mass storage device (e.g., a floppy disk, a CD, and a DVD). For example, the machine accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium. Further, although a particular order of actions is illustrated in FIG. 9, these actions can be performed in other temporal sequences. Again, the flow diagram 900 is merely provided and described in connection with the components of FIGS. 2 to 5 as an example of one way to configure a system to embed watermarks in a compressed digital data stream.

In the example of FIG. 9, the process begins with the identifying unit 410 (FIG. 4) identifying a frame associated with the compressed digital data stream 240 (FIG. 2) such as Frame A (FIG. 5) (block 910). The identified frame may include a plurality of MDCT coefficient sets formed by overlapping and concatenating a plurality of audio blocks. In accordance with the AC-3 compression standard, for example, a frame may include six MDCT coefficient sets (i.e., six "audblk"). Further, the identifying unit 410 (FIG. 4) also identifies header information associated with the frame (block 920). For example, the identifying unit 410 may identify the number of channels associated with the compressed digital data stream 240.

The unpacking unit 420 then unpacks the plurality of MDCT coefficient sets to determine compression information associated with the original compression process used to generate the compressed digital data stream 240 (block 930). In particular, the unpacking unit 420 identifies the mantissa $M_k$ and the exponent $X_k$ of each MDCT coefficient $m_k$ of each of the MDCT coefficient sets. The exponents of the MDCT coefficients may then be grouped in a manner compliant with the AC-3 compression standard. The unpacking unit 420 (FIG. 4) also determines the number of bits used to represent the mantissa of each of the MDCT coefficients so that a suitable quantization look-up table specified by the AC-3 compression standard may be used to modify or augment the plurality of MDCT coefficient sets as described above in connection with FIG. 6. Control then proceeds to block 940 which is described in greater detail below in connection with FIG. 10.

Figure 10:
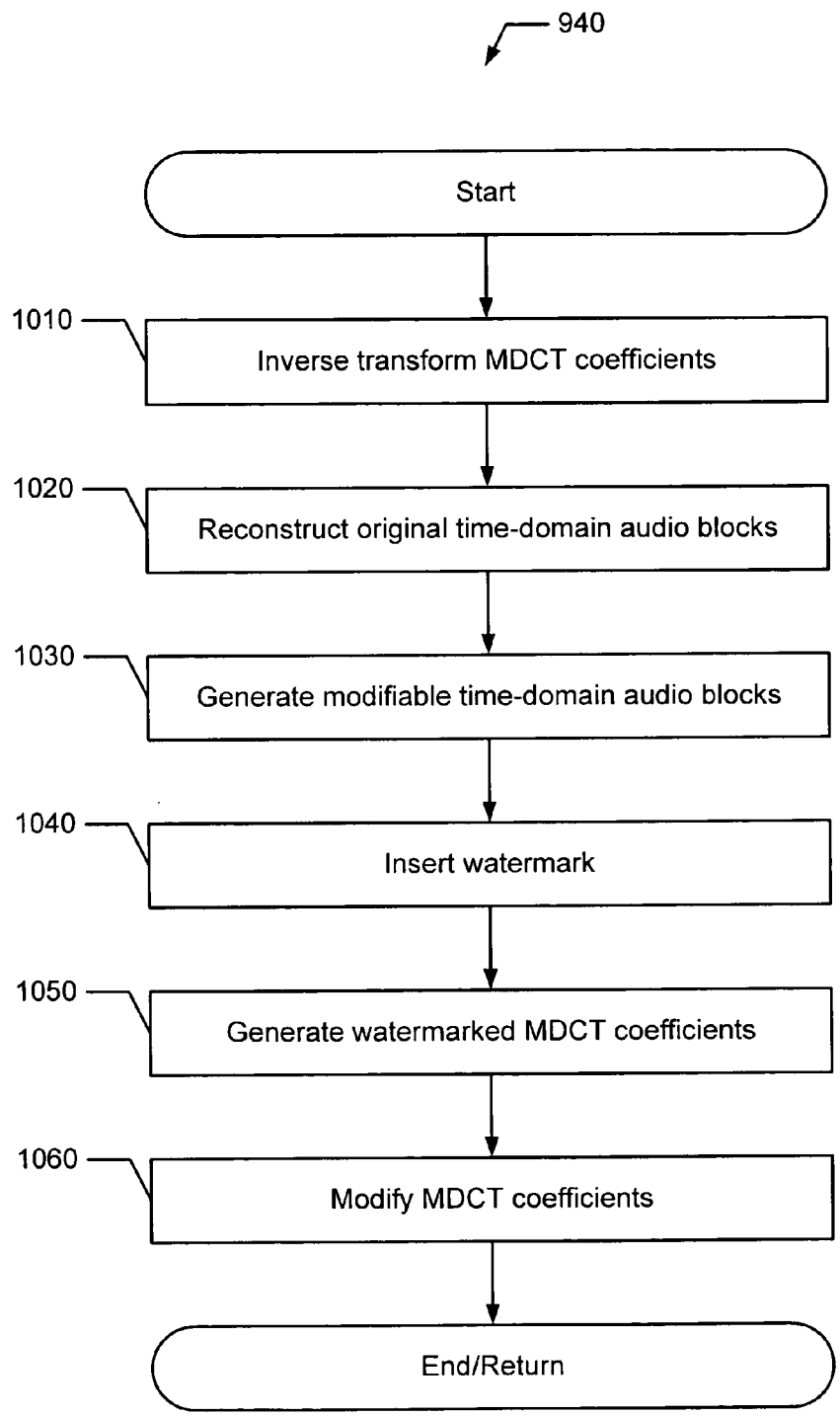
FIG. 10 depicts one manner in which the modification process of FIG. 9 may be implemented.

As illustrated in FIG. 10, the modification process 940 begins by using the modifying unit 430 (FIG. 4) to perform an inverse transform of the MDCT coefficient sets to generate inverse transformed time-domain audio blocks (block 1010). In particular, the modification unit 430 generates a previous (old) time-domain audio block (which, for example, is represented as a prime block in FIG. 5) and a current (new) time-domain audio block (which is represented as a double-prime block in FIG. 5) associated with each of the 256-sample original time-domain audio blocks used to generate the corresponding MDCT coefficient set. As described in connection with FIG. 5, for example, the modification unit 430 may generate TA4" and TA5' from the MDCT coefficient set MA5, TA5" and TB0' from the MDCT coefficient set MB0, and TB0" and TB1' from the MDCT coefficient set MB1. For each time-domain audio block, the modification unit 430 adds corresponding prime and double-prime blocks to reconstruct the time-domain audio block based on, for example, the Princen-Bradley TDAC technique (block 1020). Following the above example, the prime block TA5' and the double-prime block TA5" may be added to reconstruct the time-domain audio block TA5 (i.e., the reconstructed time-domain audio block TA5R) while the prime block TB0' and the double-prime block TB0" may be added to reconstruct the time-domain audio block TB0 (i.e., the reconstructed time-domain audio block TB0R).

To insert the watermark 230, the modification unit 430 generates modifiable time-domain audio blocks using the reconstructed time-domain audio blocks (block 1030). The modification unit 430 generates a modifiable 512-sample time-domain audio block using two adjacent reconstructed time-domain audio blocks. For example, the modification unit 430 may generate a modifiable time-domain audio block by concatenating the reconstructed time-domain audio blocks TA5R and TB0R of FIG. 5.

Implementing an encoding process such as, for example, one or more of the encoding methods and apparatus described in U.S. Pat. Nos. 6,272,176, 6,504,870, and/or 6,621,881, the modification unit 430 inserts the watermark 230 from the watermark source 220 into the modifiable time-domain audio blocks (block 1040). For example, the modification unit 430 may insert the watermark 230 into the 512-sample time-domain audio block generated using the reconstructed time-domain audio blocks TA5R and TB0R to generate the watermarked time-domain audio blocks TA5W and TB0W. Based on the watermarked time-domain audio blocks and the compression information, the modification unit 430 generates watermarked MDCT coefficient sets (block 1050). As noted above, two watermarked time-domain audio blocks, where each block includes 256 samples, may be used to generate a watermarked MDCT coefficient set. For example, the watermarked time-domain audio blocks TA5W and TB0W may be concatenated and then used to generate the watermarked MDCT coefficient set MA5W.

Based on the compression information associated with the compressed digital data stream 240, the modification unit 430 calculates the mantissa value associated with each of the watermarked MDCT coefficients in the watermarked MDCT coefficient set MA5W as described above in connection with FIG. 6. In this manner, the modification unit 430 can modify or augment the original MDCT coefficient sets using the watermarked MDCT coefficient sets to embed or insert the watermark 230 in the compressed digital data stream 240 (block 1060). Following the above example, the modification unit 430 may replace the original MDCT coefficient set MA5 based on the watermarked MDCT coefficient set MA5W of FIG. 5. For example, the modification unit 430 may replace an original MDCT coefficient in the MDCT coefficient set MA5 with a corresponding watermarked MDCT coefficient (which has an augmented mantissa value) from the watermarked MDCT coefficient set MA5W. Alternatively, the modification unit 430 may compute the difference between the mantissa codes associated with the original MDCT coefficient and the corresponding watermarked MDCT coefficient (i.e., $\Delta M_k = M_k - WM_k$) and modify the original MDCT coefficient based on the difference $\Delta M_k$. In either case, after modifying the original MDCT coefficient sets, the modification process 940 terminates and returns control to block 950.

Referring back to FIG. 9, the repacking unit 440 repacks the frame of the compressed digital data stream (block 950). The repacking unit 440 identifies the position of the MDCT coefficient sets within the frame so that the modified MDCT coefficient sets may be substituted in the positions of the original MDCT coefficient sets to rebuild the frame. At block 960, if the embedding device 210 determines that additional frames of the compressed digital data stream 240 need to be processed, then control returns to block 910. If, instead, all frames of the compressed digital data stream 240 have been processed, then the process 900 terminates.

As noted above, known watermarking techniques typically decompress a compressed digital data stream into uncompressed time-domain samples, insert the watermark into the time-domain samples, and recompress the watermarked time-domain samples into a watermarked compressed digital data stream. In contrast, the digital data stream 240 remains compressed during the example unpacking, modifying, and repacking processes described herein. As a result, the watermark 230 is embedded into the compressed digital data stream 240 without additional decompression/compression cycles that may degrade the quality of the content in the compressed digital data stream 500.

Figure 11:
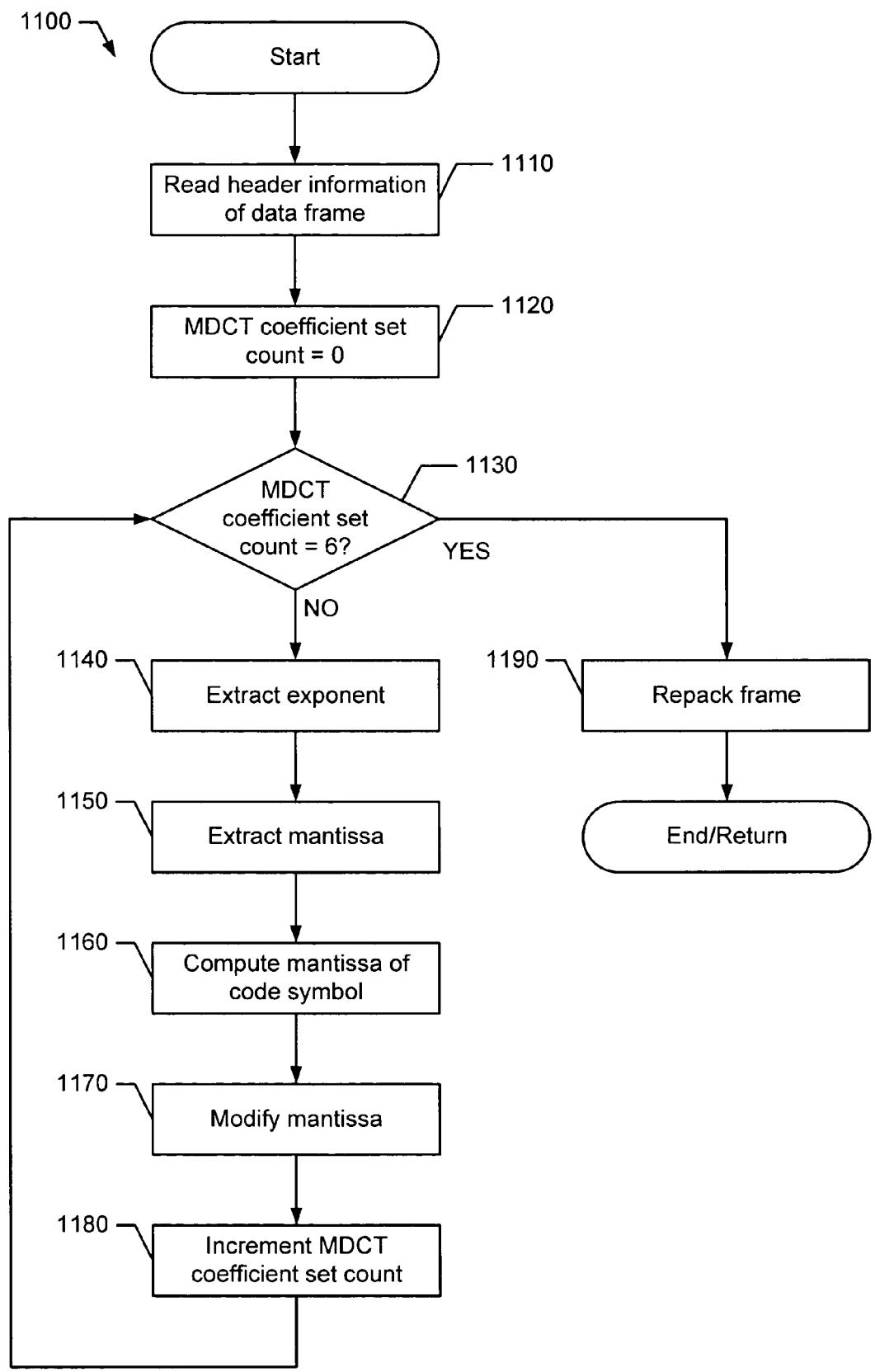
FIG. 11 depicts one manner in which a data frame may be processed.

To further illustrate the example modification process 940 of FIGS. 9 and 10, FIG. 11 depicts one manner in which a data frame (e.g., an AC-3 frame) may be processed. The example frame processing process 1100 begins with the embedding device 210 reading the header information of the acquired frame (e.g., an AC-3 frame) (block 1110) and initializing an MDCT coefficient set count to zero (block 1120). In the case where an AC-3 frame is being processed, each AC-3 frame includes six MDCT coefficient sets having compressed-domain data (e.g., MA0, MA1, MA2, MA3, MA4 and MA5 of FIG. 5, which are also known as "audblks" in the AC-3 standard). Accordingly, the embedding device 210 determines whether the MDCT coefficient set count is equal to six (block 1130). If the MDCT coefficient set count is not yet equal to six, thereby indicating that at least one more MDCT coefficient set requires processing the embedding device 210 extracts the exponent (block 1140) and the mantissa (block 1150) associated with an MDCT coefficient of the frame (e.g., the original mantissa $M_k$ described above in connection with FIG. 6). The embedding device 210 computes a new mantissa associated with a code symbol read at block 1220 (e.g., the new mantissa $WM_k$ described above in connection with FIG. 6) (block 1160) and modifies the original mantissa associated with the frame based on the new mantissa (block 1170). For example, the original mantissa may be modified based on the difference between the new mantissa and the original mantissa (but limited within the range associated with the bit representation of the original mantissa). The embedding device 210 increments the MDCT coefficient set count by one (block 1180) and control returns to block 1130. Although the example process of FIG. 11 is described above to include six MDCT coefficient sets (e.g., the threshold of the MDCT coefficient set count is six), a process utilizing more or fewer MDCT coefficient sets could be used instead. At block 1130, if the MDCT coefficient set count is equal to six, then all MDCT coefficient sets have been processed such that the watermark has been embedded and the embedding device 210 repacks the frame (block 1190).

As noted above, many methods are known to embed a watermark imperceptible to the human ear (e.g., an inaudible code) in an uncompressed audio signal. For example, one known method is described in U.S. Pat. No. 6,421,445 to Jensen et al., the disclosure of which is hereby incorporated by reference herein in its entirety. In particular, as described by Jensen et al., a code signal (e.g., a watermark) may include information at a combination of ten different frequencies, which are detectable by a decoder using a Fourier spectral analysis of a sequence of audio samples (e.g., a sequence of 12,288 audio samples as described in detail below). For example, an audio signal may be sampled at a rate of 48 kilo-Hertz (kHz) to output an audio sequence of 12,288 audio samples that may be processed (e.g., using a Fourier transform) to acquire a relatively high-resolution (e.g., 3.9 Hz) frequency domain representation of the uncompressed audio signal. However, in accordance with the encoding process of the method disclosed by Jensen et al., a sinusoidal code signal having constant amplitude across an entire sequence of audio samples is unacceptable because the sinusoidal code signal may be perceptible to the human ear. To satisfy the masking energy constraints (i.e., to ensure that the sinusoidal code signal information remains imperceptible), the sinusoidal code signal is synthesized across the entire sequence of 12,288 audio samples using a masking energy analysis which determines a local sinusoidal amplitude within each block of audio samples (e.g., wherein each block of audio samples may include 512 audio samples). Thus, the local sinusoidal waveforms may be coherent (in-phase) across the sequence of 12,288 audio samples but have varying amplitudes based on the masking energy analysis.

Figure 12:
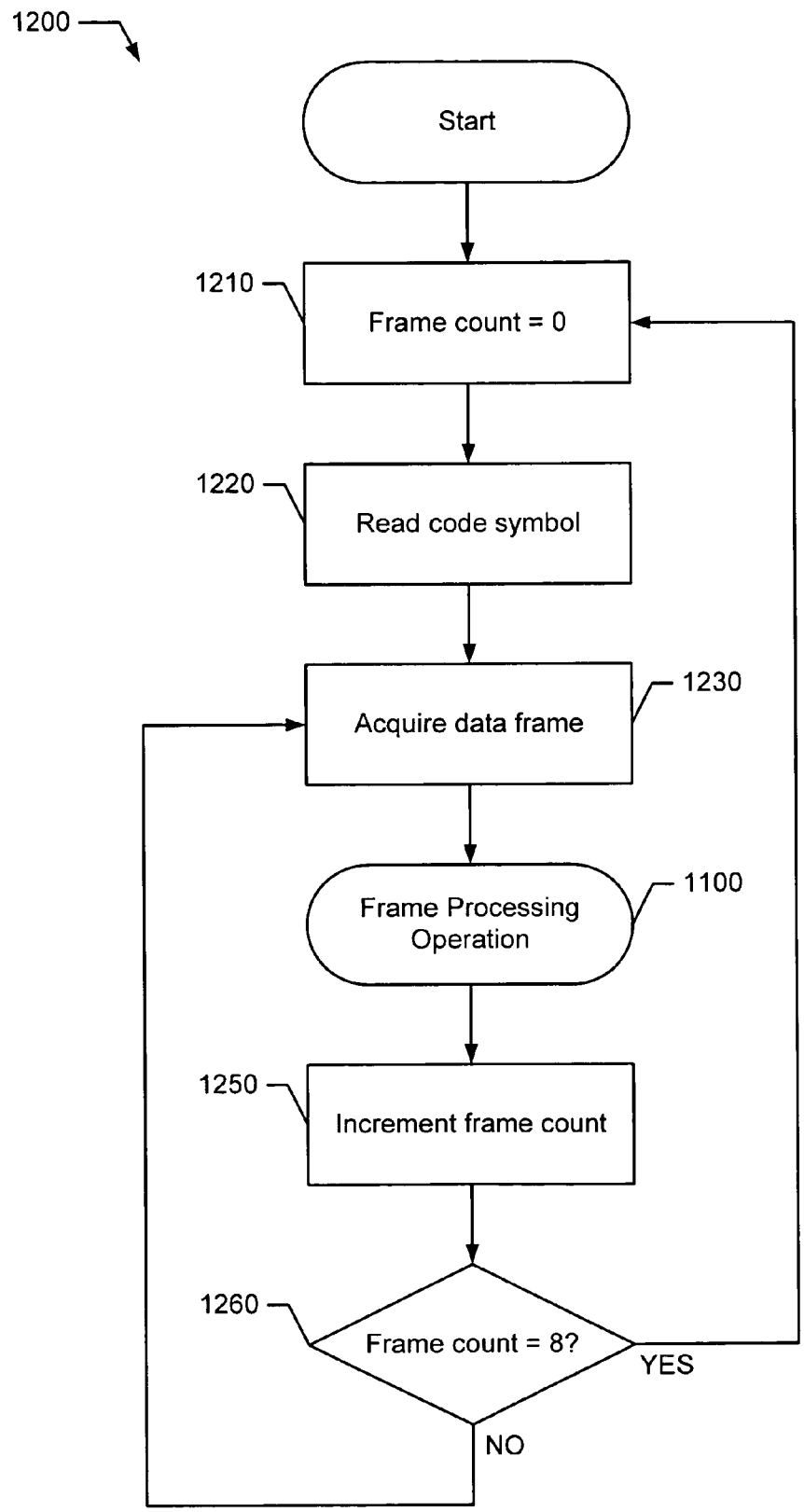
FIG. 12 depicts one manner in which a watermark may be embedded in a compressed digital data stream.

However, in contrast to the method disclosed by Jensen et al., the methods and apparatus described herein may be used to embed a watermark or other code signal in a compressed audio signal in a manner such that a compressed digital data stream containing the compressed audio signal remains compressed during the unpacking, modifying, and repacking processes. FIG. 12 depicts one manner in which a watermark, such as that disclosed by Jensen et al., may be inserted in a compressed audio signal. The example process 1200 begins with initializing a frame count to zero (block 1210). Eight frames (e.g., AC-3 frames) representing a total of 12,288 audio samples of each audio channel may be processed to embed one or more code symbols (e.g., one or more of the symbols "0", "1", "S", and "E" shown in FIG. 13 and described in Jensen, et al.) into the audio signal. Although the compressed digital data stream is described herein to include 12,288 audio samples, the compressed digital data stream may have more or less audio samples. The embedding device 210 (FIG. 2) may read a watermark 230 from the watermark source 220 to inject one or more code symbols into the sequence of frames (block 1220). The embedding device 210 may acquire one of the frames (block 1230) and proceed to the frame processing operation 1100 described above to process the acquired frame. Accordingly, the example frame processing operation 1100 terminates and control returns to block 1250 to increment the frame count by one. The embedding device 210 determines whether the frame count is eight (block 1260). If the frame count is not eight, the embedding device 210 returns to acquire another frame in the sequence and repeat the example frame processing operation 1100 as described above in connection with FIG. 11 to process another frame. If, instead, the frame count is eight, the embedding device 210 returns to block 1210 to reinitialize the frame count to zero and repeat the process 1200 to process another sequence of frames.

As noted above, a code signal (e.g., the watermark 230) may be embedded or injected into the compressed digital data stream (e.g., an AC-3 data stream). As shown in the example table 1300 of FIG. 13 and described in Jensen, et al., the code signal may include a combination of ten sinusoidal components corresponding to frequency indices $f_1$ through $f_{10}$ to represent one of four code symbols "0," "1," "S," and "E." For example, the code symbol "0" may represent a binary value of zero and the code symbol "1" may represent a binary value of one. Further, the code symbol "S" may represent the start of a message and the code symbol "E" may represent the end of a message. While only four code symbols are shown in FIG. 13, more or fewer code symbols could be used instead. Additionally, table 1300 lists the transform bins corresponding to the center frequencies about which the ten sinusoidal components for each symbol are located. For example, the 512-sample central frequency indices (e.g., 10, 12, 14, 16, 18, 20, 22, 24, 26, and 28) are associated with a low resolution frequency domain representation of the compressed digital data stream and the 12,288-sample central frequency indices (e.g., 240, 288, 336, 384, 432, 480, 528, 576, 624, and 672) are associated with a high resolution frequency domain representation of the compressed digital data stream.

As noted above, each code symbol may be formed using ten sinusoidal components associated with the frequency indices $f_1$ through $f_{10}$ depicted in table 1300. For example, a code signal for injecting or embedding the code symbol "0" includes ten sinusoidal components corresponding to the frequency indices 237, 289, 339, 383, 429, 481, 531, 575, 621, and 673, respectively. Likewise, a code signal for injecting or embedding the code symbol "1" includes ten sinusoidal components corresponding to the frequency indices 239, 291, 337, 381, 431, 483, 529, 573, 623, and 675, respectively. As shown in the example table 1300, each of the frequency indices $f_1$ through $f_{10}$ has a unique frequency value at or proximate to each of the 12,288-sample central frequency indices.

Each of the ten sinusoidal components associated with the frequency indices $f_1$ through $f_{10}$ may be synthesized in the time domain using the methods and apparatus described herein. For example, the code signal for injecting or embedding the code symbol "0" may include sinusoids $c_1(k)$, $c_2(k)$, $c_3(k)$, $c_4(k)$, $c_5(k)$, $c_6(k)$, $c_7(k)$, $c_8(k)$, $c_9(k)$, and $c_{10}(k)$. The first sinusoid $c_1(k)$ may be synthesized in the time domain as a sequence of samples as follows:

$$c_1(k) = \cos\frac{2\pi * 237k}{12288}$$

for k=0 through 12287. However, the sinusoid $c_1(k)$ generated in this manner would have a constant amplitude over the entire 12,288 sample window. Instead, to generate a sinusoid whose amplitude may be varied from audio block to audio block, the sample values in a 512-sample audio block (e.g., a long AC-3 block) associated with the first sinusoid $c_1(k)$ may be computed as follows:

$$c_{1p}(m) = w(m)\cos\frac{2\pi * 237 * (p*256 + m)}{12288}$$

for m=0 through 511 and p=0 through 46, where w(m) is the window function used in the AC-3 compression described above. One having ordinary skill in the art will appreciate that the preceding equation may be used directly to compute $c_{1p}(m)$, or $c_1(k)$ may be pre-computed and appropriate segments extracted to generate $c_{1p}(m)$. In either case, the MDCT transform of $c_{1p}(m)$ includes a set of MDCT coefficient values (e.g., 256 real numbers). Continuing with the preceding example, for $c_{1p}(m)$ corresponding to symbol "0," the MDCT coefficient values associated with the 512-sample frequency indices 9, 10, and 11 may have significant magnitudes because $c_{1p}(m)$ is associated with the 12,288-sample central frequency index 240, which corresponds to the 512-sample central frequency index 10. The MDCT coefficient values associated with other 512-sample frequency indices will be negligible relative to the MDCT coefficient values associated with the 512-sample frequency indices 9, 10, and 11 for the case of $c_{1p}(m)$. Conventionally, the MDCT coefficient values associated with $c_{1p}(m)$ (as well as the other sinusoidal components $c_{2p}(m), \ldots, c_{10p}(m)$) are divided by a normalization factor Q as follows:

$$Q = \frac{512}{4} = 128,$$

where 512 is a number of samples associated with each block. This normalization allows a time-domain cosine wave of unit amplitude at the 12,288-sample central frequency index 240 to produce a unit amplitude MDCT coefficient at the 512-sample central frequency index 10.

Continuing with the preceding example, for $c_{1p}(m)$ associated with code symbol "0," the code frequency index 237 (e.g., the frequency value corresponding to the frequency index $f_1$ associated with the code symbol "0") causes the 512-sample central frequency index 10 to have the highest MDCT magnitude relative to the 512-sample frequency indices 9 and 11 because the 512-sample central frequency index 10 corresponds to the 12,288-sample central frequency index 240 and the code frequency index 237 is proximate to the 12,288-sample central frequency index 240. Likewise, the second frequency index $f_2$ corresponding to the code frequency index 289 may produce MDCT coefficients with significant MDCT magnitudes in the 512-sample frequency indices 11, 12, and 13. The code frequency index 289 may cause the 512-sample central frequency index 12 to have the highest MDCT magnitude because the 512-sample central frequency index 12 corresponds to the 12,288-sample central frequency index 288 and the code frequency index 289 is proximate to the 12,288-sample central frequency index 288. Similarly, the third frequency index $f_3$ corresponding to the code frequency index 339 may produce MDCT coefficients with significant MDCT magnitudes in the 512-sample frequency indices 13, 14, and 15. The code frequency index 339 may cause the 512-sample central frequency index 14 to have the highest MDCT magnitude because the 512-sample central frequency index 14 corresponds to the 12,288-sample central frequency index 336 and the code frequency index 339 is proximate to the 12,288-sample central frequency index 336. Based on the sinusoidal components at each of the ten frequency indices $f_1$ through $f_{10}$, the MDCT coefficients representing the actual watermarked code signal will correspond to the 512-sample frequency indices ranging from 9 to 29. Some of the 512-sample frequency indices, such as, for example, 9, 11, 13, 15, 17, 19, 21, 23, 25, 27, and 29 may be influenced by energy spill-over from two neighboring code frequency indices, with the amount of spill-over a function of the weighting applied to each sinusoidal component based on the masking energy analysis. Accordingly, in each 512-sample audio block of the compressed digital data stream, the MDCT coefficients may be computed as described below to represent the code signal.

In the compressed AC-3 data stream, for example, each AC-3 frame includes MDCT coefficient sets having six MDCT coefficients (e.g., MA0, MA1, MA2, MA3, MA4, and MA5 of FIG. 5) with each MDCT coefficient corresponding to a 512-sample audio block. As described above in connection with FIGS. 5 and 6, each MDCT coefficient is represented as $m_k = M_k * 2^{-X_k} = (s_k * N_k) * 2^{-X_k}$, where $X_k$ is the exponent and $M_k$ is the mantissa. The mantissa $M_k$ is a product of a mantissa step size $s_k$ and an integer value $N_k$. The mantissa step size $s_k$ and the exponent $X_k$ may be used to form a quantization step size $S_k = s_k * 2^{-X_k}$. Referring to the look-up table 600 of FIG. 6, for example, the mantissa step size $s_k$ is $2/15$ and the integer value $N_k$ is $-2$ when the original mantissa value is $-0.2666$ (i.e., $-4/15$).

To inject a code signal into the compressed AC-3 data stream, modifications to the mantissa set $M_k$ for k=9 through 29 are determined. For example, consider a subset of the mantissa set $M_k$ for k=9 through 29 in which the MDCT coefficient magnitudes $C_9$, $C_{10}$, and $C_{11}$ corresponding to the watermarked MDCT coefficients $wm_9$, $wm_{10}$, and $wm_{11}$ are $-0.3$, $0.8$, and $0.2$, respectively (with the varying amplitude based on the local masking energy). Furthermore, assume that the code MDCT magnitude $C_{11}$ associated with the 512-sample central frequency index 11 is the MDCT coefficient having the lowest absolute magnitude (e.g., an absolute value of 0.2) for the entire mantissa set ($C_k$ for k=9 through 29). The value of the code MDCT magnitude $C_{11}$ is used to normalize and modify the values of the MDCT coefficients $m_9$, $m_{10}$, and $m_{11}$ (as well as the other MDCT coefficients in the set $m_9$ through $m_{29}$) because the code MDCT magnitude $C_{11}$ has the lowest absolute magnitude. First, $C_{11}$ is normalized to 1.0 and then used to normalize, for example, $C_9$ and $C_{10}$ as $C_9 = -0.3/C_{11} = -1.5$ and $C_{10} = 0.8/C_{11} = 4.0$. Then, the mantissa integer value $N_{11}$ corresponding to the original MDCT coefficient $m_{11}$ is increased by 1 to as this is the minimum amount (due to mantissa step size quantization) by which $m_{11}$ may be modified to reflect the addition of the watermark code corresponding to $C_{11}$. Finally, the mantissa integer values $N_9$ and $N_{10}$ corresponding to the original MDCT coefficients $m_9$ and $m_{10}$ are modified relative to $N_{11}$ as follows:

$$N_9 \to N_9 + \frac{-1.5 * S_{11}}{S_9} \text{ and } N_{10} \to N_{10} + \frac{4.0 * S_{11}}{S_{10}}.$$

Thus, the modified mantissa integer values $N_9$, $N_{10}$, and $N_{11}$ (and the similarly modified mantissa integers $N_{12}$ through $N_{29}$) may be used to modify the corresponding original MDCT coefficients to embed the watermark code. Also, as mentioned previously, for any MDCT coefficient, the maximum change is limited by the upper and lower limits of its mantissa integer value $N_k$. Referring to FIG. 6, for example, the table 600 indicates lower limit and upper limit values of $-0.9333$ to $+0.9333$.

Thus, the preceding example illustrates how the local masking energy may be used to determine the code magnitude for code symbols to be embedded into a compressed audio signal digital data stream. Moreover, eight successive frames of the compressed digital data stream were modified without performing decompression of MDCT coefficients during the encoding process of the methods and apparatus described herein.

Figure 14:
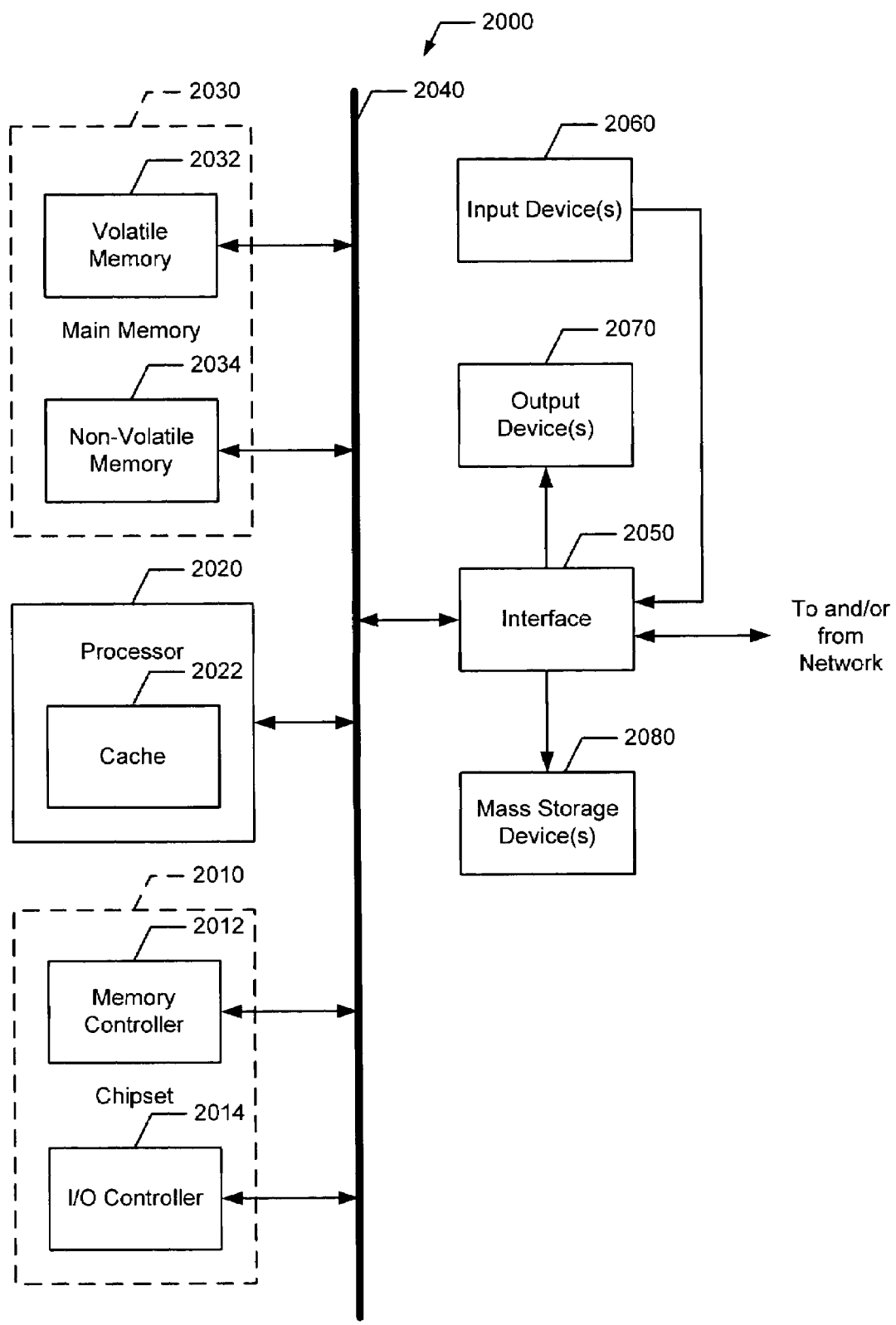
FIG. 14 is a block diagram representation of an example processor system that may be used to implement the example watermark embedding system of FIG. 2.

FIG. 14 is a block diagram of an example processor system 2000 that may used to implement the methods and apparatus disclosed herein. The processor system 2000 may be a desktop computer, a laptop computer, a notebook computer, a personal digital assistant (PDA), a server, an Internet appliance or any other type of computing device.

The processor system 2000 illustrated in FIG. 14 includes a chipset 2010, which includes a memory controller 2012 and an input/output (I/O) controller 2014. As is well known, a chipset typically provides memory and I/O management functions, as well as a plurality of general purpose and/or special purpose registers, timers, etc. that are accessible or used by a processor 2020. The processor 2020 is implemented using one or more processors. In the alternative, other processing technology may be used to implement the processor 2020. The processor 2020 includes a cache 2022, which may be implemented using a first-level unified cache (L1), a second-level unified cache (L2), a third-level unified cache (L3), and/or any other suitable structures to store data.

As is conventional, the memory controller 2012 performs functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 also includes an interface circuit 2050 that is coupled to the bus 2040. The interface circuit 2050 may be implemented using any type of well known interface standard such as an Ethernet interface, a universal serial bus (USB), a third generation input/output interface (3GIO) interface, and/or any other suitable type of interface.

One or more input devices 2060 are connected to the interface circuit 2050. The input device(s) 2060 permit a user to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 are also connected to the interface circuit 2050. For example, the output device(s) 2070 may be implemented by media presentation devices (e.g., a light emitting display (LED), a liquid crystal display (LCD), a cathode ray tube (CRT) display, a printer and/or speakers). The interface circuit 2050, thus, typically includes, among other things, a graphics driver card.

The processor system 2000 also includes one or more mass storage devices 2080 to store software and data. Examples of such mass storage device(s) 2080 include floppy disks and drives, hard disk drives, compact disks and drives, and digital versatile disks (DVD) and drives.

The interface circuit 2050 also includes a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network is typically controlled by the I/O controller 2014 in a conventional manner. In particular, the I/O controller 2014 performs functions that enable the processor 2020 to communicate with the input device(s) 2060, the output device(s) 2070, the mass storage device(s) 2080 and/or the network via the bus 2040 and the interface circuit 2050.

While the components shown in FIG. 14 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

The methods and apparatus disclosed herein are particularly well suited for use with data streams implemented in accordance with the AC-3 standard. However, the methods and apparatus disclosed herein may be applied to other digital audio coding techniques.

In addition, while this disclosure is made with respect to example television systems, it should be understood that the disclosed system is readily applicable to many other media systems. Accordingly, while this disclosure describes example systems and processes, the disclosed examples are not the only way to implement such systems.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents. For example, although this disclosure describes example systems including, among other components, software executed on hardware, it should be noted that such systems are merely illustrative and should not be considered as limiting. In particular, it is contemplated that any or all of the disclosed hardware and software components could be embodied exclusively in dedicated hardware, exclusively in firmware, exclusively in software or in some combination of hardware, firmware, and/or software.

What is claimed is:

1. A method of embedding a watermark comprising:
identifying one or more frames associated with a compressed digital data stream;
unpacking each of the one or more frames to identify a plurality of transform coefficient sets; and
modifying the plurality of transform coefficient sets to embed the watermark by:
determining a mantissa code associated with a watermarked transform coefficient of one of a plurality of watermarked transform coefficient sets; and
substituting the mantissa code associated with the watermarked transform coefficient for a mantissa code associated with a corresponding transform coefficient of one of the plurality of transform coefficient sets.

2. A method as defined in claim 1, wherein modifying the plurality of transform coefficient sets comprises substituting a watermarked transform coefficient set for at least one of the plurality of transform coefficient sets.

3. A method as defined in claim 1, wherein determining the mantissa code associated with the watermarked transform coefficient of the one of the plurality of watermarked transform coefficient sets comprises:
selecting a code signal frequency to encode to the plurality of transform coefficient sets based on data to be embedded;
determining a masking energy associated with the code signal frequency to be encoded to the plurality of transform coefficient sets;
selecting a magnitude for the watermarked transform coefficient based on the masking energy; and
determining the mantissa code associated with the watermarked transform coefficient based on the magnitude.

4. A method as defined in claim 3, wherein the code signal frequency comprises a frequency corresponding to one of a plurality of high resolution frequency domain representations.

5. A method as defined in claim 3, wherein the code signal comprises one or more sinusoidal components, and wherein each sinusoidal component has a frequency based on a desired code.

6. A method as defined in claim 1, wherein modifying the plurality of transform coefficient sets comprises:
generating a plurality of time-domain audio blocks based on the plurality of transform coefficient sets;
generating a plurality of reconstructed audio blocks based on the plurality of time-domain audio blocks; and
generating a plurality of watermarked audio blocks based on the plurality of reconstructed audio blocks.

7. A method as defined in claim 6, wherein generating the plurality of time-domain audio blocks comprises generating a first time-domain audio block and a second time-domain audio block associated with an original audio block.

8. A method as defined in claim 6, wherein generating the plurality of reconstructed audio blocks based on the plurality of time-domain audio blocks comprises generating a reconstructed time-domain audio block corresponding to an original audio block based on a first time-domain audio block and a second time-domain audio block.

9. A method as defined in claim 8, wherein generating the fieit-reconstructed time-domain audio block the first audio block based on the first time domain audio block and the second time domain audio block comprises adding the first and second time-domain audio blocks.

10. A method as defined in claim 6, wherein generating the plurality of watermarked audio blocks based on the plurality of reconstructed audio blocks comprises:
generating a modifiable time-domain audio block based on the plurality of reconstructed audio blocks; and
generating a first watermarked audio block and a second watermarked audio block based on the modifiable time-domain audio block and the watermark.

11. A method as defined in claim 10, wherein generating the modifiable time-domain audio block based on the plurality of reconstructed audio blocks comprises concatenating a first reconstructed audio block and a second reconstructed audio block to form a 512-sample audio block.

12. A method as defined in claim 1, wherein modifying the plurality of transform coefficient sets comprises modifying the plurality of transform coefficient sets based on the plurality of watermarked transform coefficient sets.

13. A method as defined in claim 1, wherein modifying the plurality of transform coefficient sets comprises generating the plurality of watermarked transformed coefficient sets based on a first watermarked audio block and a second watermarked audio block.

14. A method as defined in claim 13, wherein generating the plurality of watermarked coefficient sets based on the first and second watermarked audio blocks comprises determining a respective mantissa code associated with at least one watermarked transform coefficient of each of the plurality watermarked transform coefficient sets based on compression information associated with the compressed digital data stream.

15. A method as defined in claim 1, wherein each of the plurality of transform coefficient sets comprises one or more modified discrete cosine transform coefficients.

16. A method as defined in claim 1, wherein the compressed digital data stream is compressed in accordance with an audio compression standard.

17. A method as defined in claim 1, wherein identifying the one or more frames associated with the compressed digital data stream comprises identifying audio blocks associated with at least one of a plurality of audio channels.

18. A method as defined in claim 1, wherein unpacking each of the one or more frames to identify the plurality of transform coefficient sets comprises identifying compression information associated with the compressed digital data stream.

19. A method as defined in claim 1 further comprising repacking the one or more frames base4-en-a-based on the plurality of watermarked transform coefficient sets.

20. A method as defined in claim 1, wherein the watermark is associated with one of a media source and a media program.

21. An apparatus for embedding a watermark comprising:
an identifier to identify one or more frames associated with a compressed digital data stream;
an unpacker to unpack each of the one or more frames to identifying a plurality of transform coefficient sets; and
a modifier to determine a mantissa code associated with a watermarked transform coefficient of one of a plurality of watermarked transform coefficient sets and to substitute the mantissa code associated with the watermarked transform coefficient for a mantissa code associated with a corresponding transform coefficient of one of the plurality of transform coefficient sets to modify the plurality of transform coefficient sets to embed the watermark.

22. An apparatus as defined in claim 21, wherein the modifier selects a code signal frequency to encode to the plurality of transform coefficient sets based on data to be embedded, determines a masking energy associated with the code signal frequency to be encoded to the plurality of transform coefficient sets, selects a magnitude for the watermarked transform coefficient based on the masking energy, and determines the mantissa code associated with the watermarked transform coefficient based on the magnitude.

23. An apparatus as defined in claim 22, wherein the code signal frequency comprises a frequency corresponding to one of a plurality of high resolution frequency domain representations.

24. An apparatus as defined in claim 22, wherein the code signal frequency comprises one or more sinusoidal components, and wherein each sinusoidal component has a frequency based on a desired code.

25. An apparatus as defined in claim 21, wherein the modifier generates a plurality of time-domain audio blocks, generates a plurality of reconstructed audio blocks based on the plurality of time-domain audio blocks, and generates a plurality of watermarked audio blocks based on the plurality of reconstructed audio blocks.

26. An apparatus as defined in claim 25, wherein the modifier generates a first time-domain audio block and a second time-domain audio block associated with an original audio block.

27. An apparatus as defined in claim 25, wherein the modifier generates a reconstructed time-domain audio block corresponding to an original audio block based on a first time-domain audio block and a second time-domain audio block.

28. An apparatus as defined in claim 27, wherein the modifier adds the first and second time-domain audio blocks.

29. An apparatus as defined in claim 25, wherein the modifier generates a modifiable time-domain audio block based on the plurality of reconstructed audio blocks, and generates a first watermarked audio block and a second watermarked audio block based on the modifiable time-domain audio block and the watermark.

30. An apparatus as defined in claim 29, wherein the modifier concatenates a first reconstructed audio block and a second reconstructed audio block to form a 512-sample audio block.

31. An apparatus as defined in claim 30, wherein the modifier determines a respective mantissa code associated with each watermarked coefficient of at least one of the plurality watermarked coefficient sets based on compression information of the compressed digital data stream.

32. An apparatus as defined in claim 21, wherein the modifier modifies the plurality of transform coefficient sets based based on the plurality of watermarked transform coefficient sets.

33. An apparatus as defined in claim 32, wherein the modifier generates one of the plurality of watermarked transform coefficient sets based on a first watermarked audio block and a second watermarked audio block.

34. An apparatus as defined in claim 32, wherein the modifier substitutes one of the plurality of watermarked transform coefficient sets for one of the plurality of transform coefficient sets.

35. An apparatus as defined in claim 21, wherein each of the plurality of transform coefficient sets comprises one or more modified discrete cosine transform coefficients.

36. An apparatus as defined in claim 21, wherein the compressed digital data stream is compressed in accordance with an audio compression standard.

37. An apparatus as defined in claim 21, wherein the identifying unit identifies audio blocks associated with a plurality of audio channels.

38. An apparatus as defined in claim 21, wherein the unpacking unit identifies compression information associated with the compressed digital data stream.

39. An apparatus as defined in claim 21, wherein the watermark comprises a watermark associated with one of a media source and a media program.

40. An apparatus as defined in claim 21 further comprising a frame repacker to repack the one or more frames based on the plurality of watermarked transform coefficient sets.

41. A computer accessible medium storing computer readable instructions, which when executed, cause a computer to:
identify one or more frames associated with a compressed digital data stream;
unpack each of the one or more frames to identify a plurality of transform coefficient sets; and
modify the plurality of transform coefficient sets to embed a watermar by:
determining a mantissa code associated with a watermarked transform coefficient of one of a plurality of watermarked transform coefficient sets; and
substituting the mantissa code associated with the watermarked transform coefficient for a mantissa code associated with a corresponding transform coefficient of one of the plurality of transform coefficient sets.

42. A computer accessible medium as defined in claim 41, wherein the instructions, which when executed, cause the computer to modify the plurality of transform coefficient sets by substituting at least one of the watermarked transform coefficient sets for at least one of the plurality of transform coefficient sets.

43. A computer accessible medium as defined in claim 41, wherein the instructions, which when executed, cause the computer to determine the mantissa code associated with the watermarked transform coefficient of the one of the plurality of watermarked transform coefficient sets by:
selecting a code signal frequency to encode to the plurality of transform coefficient sets based on data to be embedded;
determining a masking energy associated with the code signal frequency to be encoded to the plurality of transform coefficient sets;
selecting a magnitude for the watermarked transform coefficient based on the masking energy; and
determining the mantissa code associated with the watermarked transform coefficient based on the magnitude.

44. A computer accessible medium as defined in claim 43, wherein the code signal frequency comprises a frequency corresponding to one of a plurality of high resolution frequency domain representations.

45. A computer accessible medium as defined in claim 43, wherein the code signal frequency comprises one or more sinusoidal components, and wherein each sinusoidal component has a frequency based on a desired code.

46. A computer accessible medium as defined in claim 41, wherein the instructions, which when executed, cause the computer to modify the plurality of transform coefficient sets by:
generating a plurality of time-domain audio blocks based on the plurality of transform coefficient sets;
generating a plurality of reconstructed audio blocks based on the plurality of time-domain audio blocks; and
generating a plurality of watermarked audio blocks based on the plurality of reconstructed audio blocks.

47. A computer accessible medium as defined in claim 46, wherein the instructions, which when executed, cause the computer to generate the plurality of time-domain audio blocks by generating a first time-domain audio block and a second time-domain audio block associated with an original audio block.

48. A computer accessible medium as defined in claim 46, wherein the instructions, which when executed, cause the computer to generate a reconstructed time-domain audio block corresponding to an original audio block based on a first time-domain audio block and a second time-domain audio block.

49. A computer accessible medium as defined in claim 48, wherein the instructions, which when executed, cause the computer to generate the reconstructed time-domain audio block corresponding to the original audio block bby adding the first and second time-domain audio blocks.

50. A computer accessible medium as defined in claim 46, wherein the instructions, which when executed, cause the computer to generate the plurality of watermarked audio blocks by:
generating a modifiable time-domain audio block based on the plurality of reconstructed audio blocks; and
generating a first watermarked audio block and a second watermarked audio block based on the modifiable time-domain audio block and the watermark.

51. A computer accessible medium as defined in claim 50, wherein the instructions, which when executed, cause the computer to generate the modifiable time-domain audio block by concatenating a first reconstructed audio block and a second reconstructed audio block to form a 512-sample audio block.

52. A computer accessible medium as defined in claim 46, wherein the instructions, which when executed, cause the computer to generate one of a one of the plurality of watermarked transform coefficient sets based on a first watermarked audio block and a second watermarked audio block.

53. A computer accessible medium as defined in claim 52, wherein the instructions, which when executed, cause the computer to generate the one of the plurality of watermarked coefficient sets by determining a mantissa code associated with each watermarked transform coefficient of the one of the plurality watermarked coefficient sets based on compression information associated with the compressed digital data stream.

54. A computer accessible medium as defined in claim 41, wherein each of the plurality of transform coefficient sets comprises one or more modified discrete cosine transform coefficients.

55. A computer accessible medium as defined in claim 41, wherein the compressed digital data stream is compressed in accordance with an audio compression standard.

56. A computer accessible medium as defined in claim 41, wherein the instructions, which when executed, cause the computer to identify the one or more frames associated with the compressed digital data stream by identifying audio blocks associated with at least one of a plurality of audio channels.

57. A computer accessible medium as defined in claim 41, wherein the instructions cause the computer to unpack each of the one or more frames to identify the plurality of transform coefficient sets by identifying compression information associated with the compressed digital data stream.

58. A computer accessible medium as defined in claim 41, wherein the instructions, which when executed, cause the computer to repack the one or more frames based on the plurality of watermarked transform coefficient sets.

59. A computer accessible medium as defined in claim 41, wherein the watermark is associated with one of a media source and a media program.

60. A computer accessible medium as defined in claim 41 comprising one of a programmable gate array, application specific integrated circuit, erasable programmable read only memory, read only memory, random access memory, magnetic media, and optical media.

* * * * *

UNITED STATES PATENT AND TRADEMARK OFFICE
CERTIFICATE OF CORRECTION

| | | |
|---|---|---|
| PATENT NO. | : 7,460,684 B2 | Page 1 of 1 |
| APPLICATION NO. | : 11/298040 | |
| DATED | : December 2, 2008 | |
| INVENTOR(S) | : Venugopal Srinivasan | |

It is certified that error appears in the above-identified patent and that said Letters Patent is hereby corrected as shown below:

Col. 21, line 24 before "reconstructed time-domain" delete "feilt-".

Col. 21, lines 24-26 after "time-domain audio block" and before "comprises adding" delete "the first audio block based on the first time domain audio block and the second time domain audio block".

Col. 22, line 7 after "one or more frames" and before "based on the" delete "base4-en-a".

Col. 23, line 7 after "transform coefficient sets" delete "based".

Col. 23, line 43 before "by" delete "a watermar" and insert -- a watermark --.

Col. 24, line 38 after "original audio block" and before "adding" delete "bby" and insert -- by --.

Col. 24, line 57 after "to generate one of" and before "the plurality of" delete "a one of".

Signed and Sealed this

Thirty-first Day of March, 2009

JOHN DOLL
*Acting Director of the United States Patent and Trademark Office*